(12) United States Patent
Hiratsuka

(10) Patent No.: US 8,808,836 B2
(45) Date of Patent: Aug. 19, 2014

(54) HONEYCOMB STRUCTURE

(75) Inventor: Yuuichi Hiratsuka, Kariya (JP)

(73) Assignee: Denso Corporation, Kariya (JP)

( * ) Notice: Subject to any disclaimer, the term of this patent is extended or adjusted under 35 U.S.C. 154(b) by 320 days.

(21) Appl. No.: 13/452,302

(22) Filed: Apr. 20, 2012

(65) Prior Publication Data
US 2012/0270010 A1    Oct. 25, 2012

(30) Foreign Application Priority Data
Apr. 20, 2011    (JP) .................. 2011-094445

(51) Int. Cl.
| | | |
|---|---|---|
| *B01D 46/24* | (2006.01) | |
| *B01J 35/04* | (2006.01) | |
| *F01N 3/022* | (2006.01) | |
| *B01D 53/92* | (2006.01) | |
| *B01J 35/10* | (2006.01) | |
| *B01J 23/46* | (2006.01) | |
| *C04B 38/00* | (2006.01) | |
| *F01N 3/28* | (2006.01) | |
| *B01D 53/94* | (2006.01) | |

(52) U.S. Cl.
CPC .................. *B01J 35/10* (2013.01); *B01D 53/92* (2013.01); *B01D 46/2474* (2013.01); *B01D 2255/9202* (2013.01); *B01D 2255/9205* (2013.01); *F01N 2330/48* (2013.01); *B01J 23/464* (2013.01); *B01D 2255/1023* (2013.01); *F01N 2330/06* (2013.01); *B01D 2255/1025* (2013.01); *B01D 46/247* (2013.01); *C04B 38/0006* (2013.01); *F01N 2330/34* (2013.01); *B01J 35/04* (2013.01); *B01D 2255/1021* (2013.01); *B01D 53/94* (2013.01); *F01N 3/2825* (2013.01); *B01J 35/1076* (2013.01)
USPC ............. 428/118; 428/116; 422/180; 55/523; 502/439

(58) Field of Classification Search
CPC ............. B01D 46/2429; B01D 46/247; B01D 46/2474; F01N 2330/30; F01N 2330/34; F01N 2330/60; F01N 3/2828
USPC ......................................... 428/118
See application file for complete search history.

(56) References Cited

U.S. PATENT DOCUMENTS

| 4,835,044 A | 5/1989 | Hattori et al. |
|---|---|---|
| 5,952,079 A * | 9/1999 | Andou et al. ................ 428/116 |

(Continued)

FOREIGN PATENT DOCUMENTS

| JP | 63-224740 | 9/1988 |
|---|---|---|
| JP | 11-268018 | 10/1999 |

(Continued)

OTHER PUBLICATIONS

Office Action (2 pages) dated Apr. 16, 2013, issued in corresponding Japanese Application No. 2011-094445 and English translation (2 pages).

*Primary Examiner* — David Sample
*Assistant Examiner* — Nicholas W Jordan
(74) *Attorney, Agent, or Firm* — Nixon & Vanderhye PC

(57) ABSTRACT

A honeycomb structure has hexagonal cells surrounded by partition walls and a cylindrical outer peripheral wall covering the honeycomb structure. The partition walls have sides and intersection points. Six sides form a hexagonal cell. Three sides as the partition walls are joined to each other at a corresponding intersection point. The sides are divided into sides of basic partition walls and strength reinforcement sides as strength reinforcement partition walls. The strength reinforcement partition wall is thicker than the basic partition wall. Three strength reinforcement sides are joined at a corresponding strength reinforcement intersection point. Each strength reinforcement side in one group joined at one strength reinforcement intersection point is not connected continuously to each strength reinforcement side in another group joined at another strength reinforcement intersection point. The strength reinforcement intersection points are arranged on an entire surface of a radial cross section of the honeycomb structure.

16 Claims, 30 Drawing Sheets

(56) References Cited

U.S. PATENT DOCUMENTS

| | | |
|---|---|---|
| 6,248,421 B1 | 6/2001 | Koike et al. |
| 7,803,447 B2 * | 9/2010 | Kondo et al. ............... 428/118 |
| 2002/0160073 A1 | 10/2002 | Fukushima et al. |
| 2004/0123573 A1 | 7/2004 | Ichikawa et al. |
| 2009/0011181 A1 | 1/2009 | Mizuno et al. |
| 2010/0062213 A1 | 3/2010 | Kondo |

FOREIGN PATENT DOCUMENTS

| | | |
|---|---|---|
| JP | 2002-239644 | 8/2002 |
| JP | 2002-326035 | 11/2002 |
| JP | 2003-181233 | 7/2003 |
| JP | 3820894 | 6/2006 |
| JP | 3903733 | 1/2007 |
| JP | 2007-275873 | 10/2007 |
| JP | 2010-89077 | 4/2010 |

* cited by examiner

HONEYCOMB STRUCTURE

CROSS-REFERENCE TO RELATED APPLICATION

This application is related to and claims priority from Japanese Patent Application No. 2011-94445 filed on Apr. 20, 2011, the contents of which are hereby incorporated by reference.

BACKGROUND OF THE INVENTION

1. Field of the Invention

The present invention relates to a honeycomb structure capable of supporting catalyst which purifies exhaust gas emitted from an internal combustion engine of motor vehicles.

2. Description of the Related Art

Honeycomb structures have been known and also widely used in exhaust gas purifying systems mounted to an internal combustion engine of a motor vehicle. Such a honeycomb structure supports catalyst therein, namely, on the surface of partition walls forming a plurality of cells in order to purify exhaust gas emitted from the internal combustion engine of a motor vehicle. The honeycomb structure has a structure composed in general of a plurality of cells and a cylindrical outer peripheral wall. Each of the cells formed in the honeycomb structure is surrounded by partition walls. The cells surrounded by the partition walls on a radial cross section of a honeycomb structure have a hexagonal lattice pattern. In the above structure of the honeycomb structure, catalyst is supported on the surfaces of the cells, namely, on the partition walls. Such catalyst is capable of purifying exhaust gas emitted from an internal combustion engine.

Recently, there has been proposed a honeycomb structure having a structure which has thin partition walls in order to reduce the entire weight of the honeycomb structure and a pressure loss. The reduction of the entire weight of the honeycomb structure reduces a heat capacity of the honeycomb structure. Further, the reduction of the heat capacity of the honeycomb structure provides a rapid activation of catalyst supported in the cells, namely, on the surfaces of the partition walls which form the cells.

However, the reduction of the thickness of the partition walls decreases the entire strength of the honeycomb structure. Still further, the reduction of the thickness of the partition walls causes erosion phenomenon in the honeycomb structure. Such erosion phenomenon causes collision of foreign substances contained in exhaust gas with the honeycomb structure in an axial direction of the honeycomb structure. The collision with foreign substance contained in exhaust gas would generate abrasion of and damage to the honeycomb structure, and thereby would decrease the durability of the honeycomb structure. In order to promote the activation of catalyst, when the honeycomb structure is mounted more close to the internal combustion engine of a motor vehicle, erosion phenomenon in the honeycomb structure is more progressed.

In order to solve the above conventional problems, there have been proposed the following various conventional techniques which enhance the strength and durability of a honeycomb structure.

For example, a patent document 1 as a conventional technique, disclosed in Japanese patent laid open publication No. JP 2007-275873, shows a honeycomb structure having a strength reinforcement area. The strength reinforcement area has an approximate straight line area formed in a diameter when observed on a radial cross section of the honeycomb structure. Such a strength reinforcement area increases the strength of the entire honeycomb structure.

Further, a patent document 2 as another conventional technique, disclosed in Japanese patent laid open publication No. JP 2002-326035, shows a honeycomb structure having thick partition walls. These thick partition walls are formed at some of cells in a diameter direction of the honeycomb structure.

However, because the honeycomb structure disclosed in the conventional patent document 1 has strength reinforcement areas. In the strength reinforcement areas, reinforcement cell walls of a large thickness are sequentially formed. However, because a gap between adjacent cells in the reinforcement areas becomes narrow, catalyst is easily clogged between the adjacent cells, and this structure increases a pressure loss. The catalyst clogged in the ells increases the entire weight of the honeycomb structure. Accordingly, the increased entire weight also increases the entire heat capacity of the honeycomb structure. This decreases a rapid activation of the catalyst supported on the surfaces of the partition walls in the honeycomb structure.

Because the honeycomb structure disclosed in the conventional patent document 2 has the partition walls having a large thickness which are formed in a specified part in the entire cells, the honeycomb structure has the same problem caused by the honeycomb structure disclosed in the conventional patent document 1 as previously described.

SUMMARY

It is therefore desired to provide a honeycomb structure capable of increasing an entire strength and anti-erosion capability and capable of suppressing a pressure loss and an entire weight (as a heat capacity) from being increased.

An exemplary embodiment provides a honeycomb structure having a plurality of cells and a cylindrical outer peripheral wall. Each of the cells in the honeycomb structure has a hexagonal shape. Each cell is surrounded by six partition walls. The partition walls are arranged in a hexagonal lattice pattern on the entire of a radial cross section of the honeycomb structure. An outer surface of the honeycomb structure is covered with the cylindrical outer peripheral wall. In particular, the partition walls are composed of a plurality of sides (as the partition walls) and points of intersection points (which will be referred to as the "intersection points"). The six sides form one cell of a hexagonal shape. Three sides of the partition walls are joined at the corresponding intersection point. In the honeycomb structure, the sides of the partition walls are divided into sides of basic partition walls and strength reinforcement sides of strength reinforcement partition walls. The thickness of each of the strength reinforcement partition walls is thicker than the thickness of each of the basic partition walls. At least some of the intersection points are strength reinforcement intersection points. Three strength reinforcement sides as the strength reinforcement partition walls are joined to each other at the corresponding strength reinforcement intersection point. In particular, each of the strength reinforcement sides (which form one group of the three partition walls) joined at one strength reinforcement intersection point is not connected continuously to each of the strength reinforcement sides (which form another group of the three partition walls) joined at another strength reinforcement intersection point. The strength reinforcement intersection points are arranged on an entire surface of a radial cross section of the honeycomb structure which is perpendicular to an axial direction of the honeycomb structure.

In the honeycomb structure having the improved and novel structure according to the exemplary embodiment of the present invention, three partition walls are joined to each other at a corresponding intersection point. At least some of the intersection points are the strength reinforcement intersection points. Some of the intersection points are the strength reinforcement intersection points. That is, three strength reinforcement sides as the strength reinforcement partition walls are joined to each other at the corresponding strength reinforcement intersection point. Each of the strength reinforcement sides has a thickness which is thicker than a thickness of each of sides. The other sides (namely, other than the strength reinforcement sides) as basic partition walls are joined at a corresponding basic intersection point (not at a strength reinforcement intersection point). This structure increases the entire strength of the honeycomb structure.

The formation of the strength reinforcement intersection points and the strength reinforcement sides (which are joined at the corresponding strength reinforcement intersection point) make it possible to increase the entire strength of the honeycomb structure. Further, because the strength reinforcement sides as the strength reinforcement partition walls having a thick thickness and the strength reinforcement intersection points are formed in the honeycomb structure, it is possible for the improved structure of the honeycomb structure to suppress the generation of abrasion and damage (erosion phenomenon) caused by collision with foreign substances contained in exhaust gas. This makes it possible to increase the anti-erosion capability and the durability of the honeycomb structure.

Further, the strength reinforcement sides as the strength reinforcement partition walls joined at one strength reinforcement intersection point are not sequentially connected to or joined to the strength reinforcement sides joined at another strength reinforcement intersection point. That is, one strength reinforcement side in the strength reinforcement sides as one group is not sequentially connected to another strength reinforcement side as another group. In other words, the three strength reinforcement sides belonging to one group are connected to each other at the corresponding strength reinforcement intersection point, and do not sequentially connected to any strength reinforcement side belonging to another group of the strength reinforcement intersection point.

Still further, the strength reinforcement intersection points are arranged on the entire area of a radial cross section of the honeycomb structure. That is, the present invention avoids having a structure in which the strength reinforcement sides and the strength reinforcement intersection points are formed in a concentrated area on a radial cross section of the honeycomb structure.

The improved and novel structure of the honeycomb structure having the strength reinforcement sides and intersection points makes it possible to increase the entire strength and the anti-erosion capability and to suppress the pressure loss from being increased, and also to suppress the weight and heat capacity from being increased.

It is possible for the honeycomb structure with catalyst to suppress the pressure loss from being increased because the improved and novel structure of the honeycomb structure can suppress the cells from being clogged with catalyst. Catalyst is supported on the surface of the cells, namely, on the surface of the partition walls which form the cells. This makes it possible to prevent the exhaust gas purifying capability from being deteriorated or decreased. It is therefore possible for the present invention to provide speedy activation of catalyst which is supported on the surface of the cells in the honeycomb structure because of suppressing the increasing of the pressure loss, the weight (namely, the heat capacity) of the honeycomb structure.

The honeycomb structure having the improved and novel structure according to the present invention can increase and enhance the entire strength and the anti-erosion capability of the honeycomb structure, and suppress the pressure loss and the entire weight from being increased.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
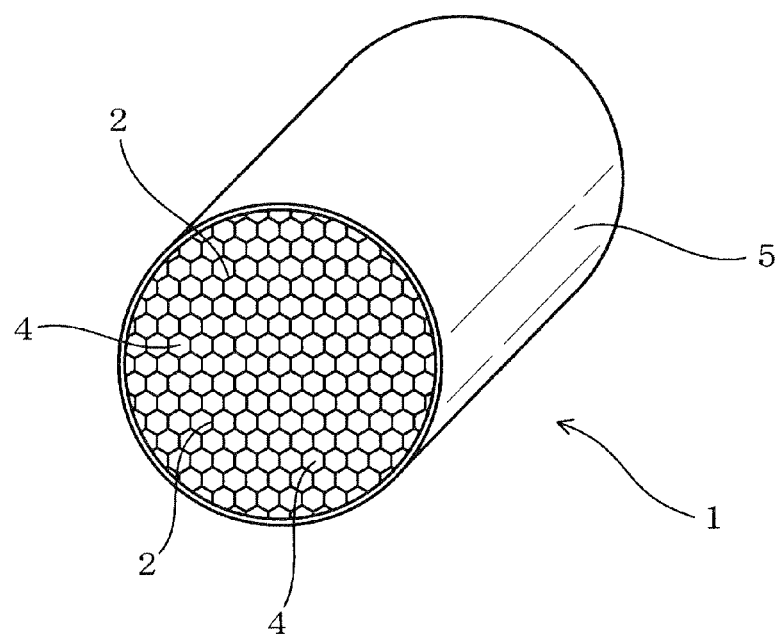
FIG. 1 is a perspective view showing an entire of a honeycomb structure according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Improved and Novel Structure and Features and Effects of Honeycomb Structure According to Exemplary Embodiments The honeycomb structure according to the present invention can be applied to exhaust gas purifying systems for an internal combustion engine of a motor vehicle. The honeycomb structure according to the present invention supports catalyst therein, which is capable of purifying exhaust gas emitted from such an internal combustion engine.

A radial cross section (or a diameter cross section) of the honeycomb structure indicates a cross section of the honeycomb structure in a diameter direction which is perpendicular to an axial direction or a longitudinal direction of the honeycomb structure.

The honeycomb structure according to the present invention has a plurality of strength reinforcement intersection points at which the strength reinforcement partition walls (or sides) are joined to each other. The strength reinforcement intersection points are formed on the entire surface of a radial cross section of the honeycomb structure, but not randomly arranged, and the strength reinforcement sides are not sequentially connected to each other on a radial cross section of the honeycomb structure.

It is possible for the honeycomb structure to have various arrangement patterns of the strength reinforcement intersection points on a radial cross section of the honeycomb structure when these arrangement patterns suppress a pressure loss and weight (heat capacity) of the honeycomb structure from being increased, and increase the entire strength and anti-erosion capability of the honeycomb structure. For example, it is possible for the honeycomb structure according to the present invention to form the strength reinforcement intersection points in a predetermined arrangement pattern, a regular arrangement pattern, or an arrangement pattern in which strength reinforcement intersection points are arranged at regular interval.

It is preferable for the honeycomb structure according to the present invention to have a structure in which three strength reinforcement sides (as three strength reinforcement partition walls) are joined to each other at the corresponding strength reinforcement intersection points. Further, the strength reinforcement intersection points are arranged in a same direction on a radial cross section. This structure of the honeycomb structure makes it possible to suppress dispersion of the effects of increasing the entire strength and anti-erosion capability as small as possible, caused by random arrangement of the strength reinforcement intersection points in different directions or.

Figure 41:
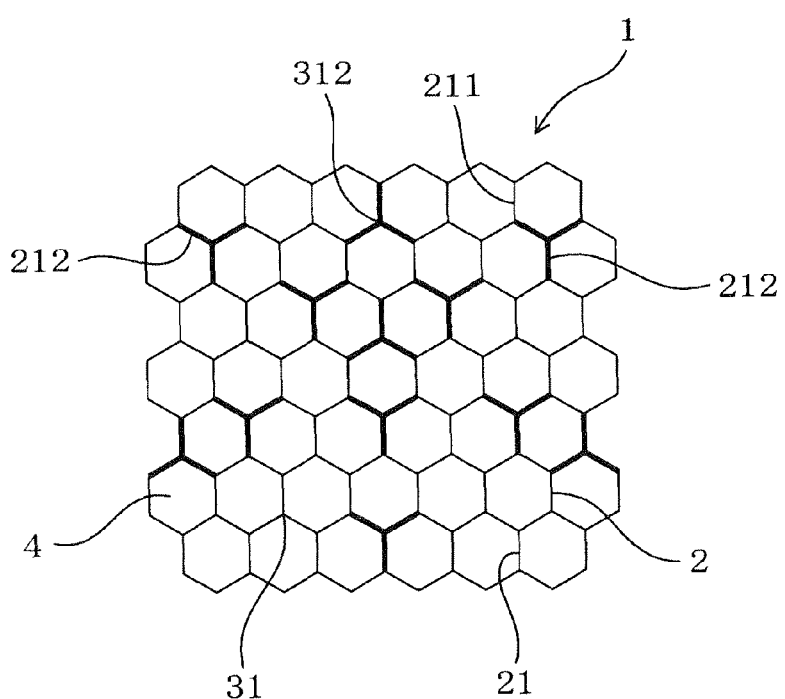
FIG. 41 is a view showing a radial cross section of a honeycomb structure on which strength reinforcement points of intersection points (which will be referred to as the "strength reinforcement intersection points"), at which three strength reinforcement sides (as three strength reinforcement partition walls) are connected to each other, are randomly arranged in different directions.

FIG. 41 is a view showing a radial cross section of a honeycomb structure on which strength reinforcement intersection points, at each of which the corresponding three strength reinforcement sides (as three strength reinforcement partition walls) are connected to each other, are randomly arranged in different directions.

However, there is a possibility to increase the pressure loss of a honeycomb structure because some strength reinforcement sides are closed to each other when the strength reinforcement intersection points. By the way, FIG. 41 uses the same reference numbers such as 211, 312 shown in FIG. 2. The structure of the honeycomb structure according to a first exemplary embodiment of the present invention shown in FIG. 2 will be explained later.

Figure 2:
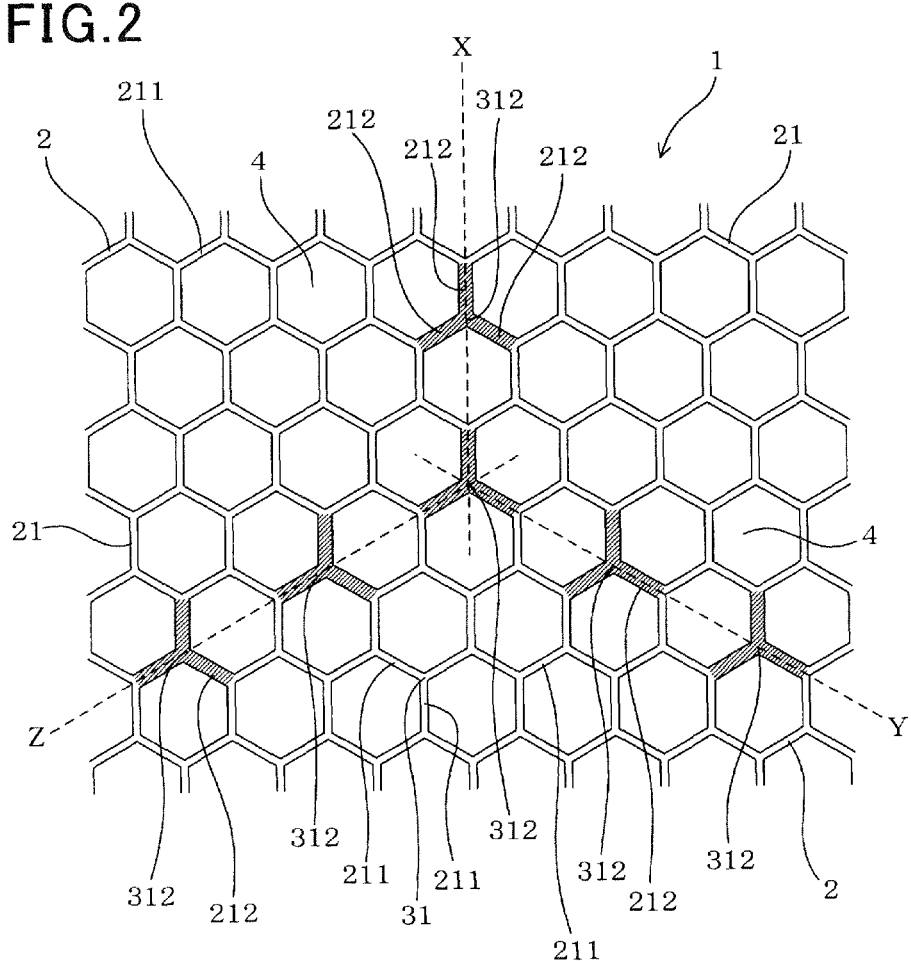
FIG. 2 is a view showing a cross section of the honeycomb structure having a plurality of cells and partition walls according to the first exemplary embodiment of the present invention.

The strength reinforcement sides of the strength reinforcement partition walls in one group (which are joined to each other at one strength reinforcement intersection point) are not sequentially connected to the strength reinforcement sides in another group (which are joined to each other at another strength reinforcement intersection point), as shown in FIG. 2, for example. This structure indicates that the strength reinforcement sides belonging to a different group are not in contact with to each other, namely, the strength reinforcement sides are not sequentially connected to each other and are not overlapped to each other on a radial cross section.

Further, when a hexagonal shaped cell (or a hexagonal cell in short) contains the strength reinforcement side as the strength reinforcement partition wall which is joined at one strength reinforcement intersection point, it is preferable for the hexagonal shaped cell does not to contain any strength reinforcement side which is connected to another strength reinforcement intersection point.

The above improved and novel structure makes it possible to suppress a pressure loss of the honeycomb structure from being increased. In particular, the above improved structure of the honeycomb structure makes it possible to avoid cells from being clogged with catalyst, and thereby to suppress a pressure loss when the honeycomb structure is used for supporting catalyst.

It is preferable for the honeycomb structure to have the strength reinforcement intersection points which are alternately arranged in one of three directions in which the sides of the partition walls are arranged on the entire of the radial cross section of the honeycomb structure. This structure makes it possible to increase the entire strength and the anti-erosion capability of the honeycomb structure and to suppress a pressure loss and the entire weight (as the heat capacity) from being increased.

A group of the three strength reinforcement sides as the strength reinforcement partition walls, which are joined to each other at the corresponding strength reinforcement intersection point, is arranged in the same direction on the entire area of a radial cross section of the honeycomb structure.

Further, the honeycomb structure according to the exemplary embodiment has the improved structure in which when six sides in a hexagonal shaped cell (or a hexagonal cell) contain a strength reinforcement side which joined to one strength reinforcement intersection point, these six sides does not contain any strength reinforcement side which is joined at another strength reinforcement intersection point.

It is preferable to arrange the strength reinforcement intersection points on the entire of the radial cross section of the honeycomb structure so as to divide the entire of the radial cross section into a plurality of areas.

Because the strength reinforcement sides as the strength reinforcement partition walls are joined at the corresponding strength reinforcement intersection point formed at the boundary of each of the divided parts, this improved structure makes it possible to further prevent abrasion and damaged area caused by erosion phenomenon from being expanded and progressed.

The above improved structure of the honeycomb structure can be produced by arranging the strength reinforcement intersection points at a regular pattern so that the shape formed by connecting the strength reinforcement intersection points of the strength reinforcement partition walls has a triangle shape or a hexagonal shape. It is also possible for the honeycomb structure to have another arrangement pattern of the cells in order to form the above structure of the cells.

It is preferable to form the strength reinforcement intersection points in a hexagonal lattice pattern on the entire surface of a radial cross section of the honeycomb structure. Because the strength reinforcement sides as the strength reinforcement partition walls are joined at the corresponding strength reinforcement intersection points which are arranged in a hexagonal lattice pattern, this improved structure makes it possible to further prevent abrasion and damaged area caused by erosion phenomenon from being expanded and progressed.

In each hexagonal shape obtained by connecting the strength reinforcement intersection points on the entire surface of a radial cross section, it is preferable for two facing sides, which face to each other in a hexagonal shape, to have a gap within a range of 20 to 50 mm. The facing sides are faced to each other in the hexagonal shape obtained by connecting the strength reinforcement intersection points on the entire surface of a radial cross section of the honeycomb structure. This structure makes it possible to adequately increase the entire strength and the anti-erosion capability of the honeycomb structure and to suppress the pressure loss and the entire weight (as the heat capacity) from being increased.

There is a problem which cannot adequately suppress catalyst from being clogged in the cells and a pressure loss from being increased when the above gap is less than 20 mm.

On the other hand, there is a possibility of not adequately increasing the entire strength and the anti-erosion capability of the honeycomb structure when the above gap exceeds 50 mm.

It is preferable for each of the strength reinforcement sides as the strength reinforcement partition walls to have a thickness which is within a range of 1.1 to 1.6 times of the thickness of each side of a basic partition wall. This structure makes it possible to have the following features simultaneously, the feature to suppress the pressure loss and the entire weight (or the heat capacity) of the honeycomb structure from being increased, and the feature to increase the entire strength and the anti-erosion capability of the honeycomb structure.

For example, when the thickness of each of the strength reinforcement sides as the strength reinforcement partition walls is less than 1.1 times of the thickness of each side of the basic partition walls, there is a possibility of not adequately increasing the entire strength and the anti-erosion capability of the honeycomb structure.

On the other hand, when the thickness of each of the strength reinforcement sides as the strength reinforcement partition walls is less than 1.1 times of the thickness of each side of the basic partition walls, there is a possibility of not adequately increasing the entire strength and the anti-erosion capability of the honeycomb structure.

On the other hand, when the thickness of each of the strength reinforcement sides of the strength reinforcement partition walls exceeds 1.6 times of the thickness of each side of the basic partition walls, there is a possibility of not adequately suppressing the pressure loss and heat capacity of the honeycomb structure from being increased.

It is possible for the honeycomb structure according to the present invention to have a structure which supports catalyst on the surface of the partition walls and the strength reinforcement partition walls. The catalyst supported in the cells (or on the surface of the partition alls) in the honeycomb structure purifies exhaust gas emitted from an internal combustion engine. The structure of the honeycomb structure previously describe makes it possible to prevent exhaust gas purifying capability from being decreased. Because the presence of clogged cells and the increase of the pressure loss decrease the exhaust gas purifying capability of the honeycomb structure, the suppression to increase of the pressure loss and the entire weight (namely, the heat capacity) provides a speedy activation of catalyst supported on the surfaces of the partition walls of the cells in the honeycomb structure. Various exemplary embodiment of the present invention will be described as follows.

First Exemplary Embodiment

A description will be given of the honeycomb structure 1 according to a first exemplary embodiment of the present invention with reference to FIG. 1 to FIG. 9.

Figure 3:
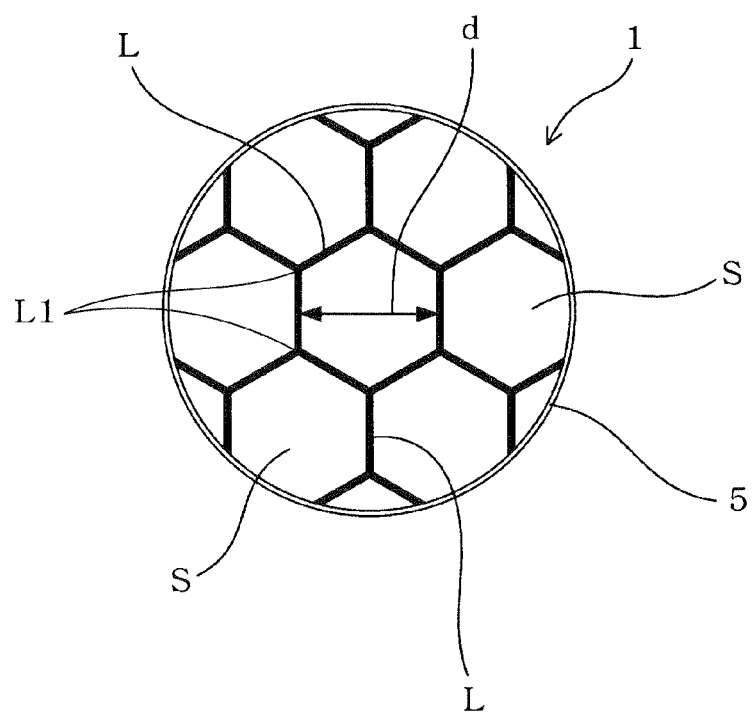
FIG. 3 is a view showing a radial cross section of the honeycomb structure according to the first exemplary embodiment of the present invention.

FIG. 1 is a perspective view showing the entire of the honeycomb structure 1 according to the first exemplary embodiment of the present invention. FIG. 2 is a view showing a cross section of the honeycomb structure 1 having a plurality of cells and partition walls according to the first exemplary embodiment of the present invention. FIG. 3 is a view showing a radial cross section of the honeycomb structure 1 according to the first exemplary embodiment of the present invention.

As shown in FIG. 1, FIG. 2 and FIG. 3, the honeycomb structure 1 has a plurality of cells 4 and a cylindrical outer peripheral wall. Each of the cells 4 has a hexagonal shape (or the hexagonal cells 4). Each hexagonal cell 4 is surrounded by six partition walls 2. The partition walls 2 are arranged in a hexagonal lattice pattern on the entire surface of a radial cross section. The outer surface of the honeycomb structure 1 is covered with the cylindrical outer peripheral wall. The partition walls 2 have a plurality of sides 21 and a plurality of intersection points 31. Six sides 21 form a hexagonal cell 4. The three sides 21 are joined at the corresponding intersection point 31. In particular, the sides 21 of the partition walls 2 are divided into sides 211 (or basic sides 211) of basic partition walls and strength reinforcement sides 212 of strength reinforcement partition walls. Each of the strength reinforcement sides 212 is thicker than each of the basic sides.

In the honeycomb structure 1, some of the intersection points 31 of the partition walls 2 are the strength reinforcement intersection points 312 at which the strength reinforcement sides 212 as the strength reinforcement partition walls are joined. The strength reinforcement sides 212, which are joined at the strength reinforcement intersection point 312, are not continued to the strength reinforcement sides 212 of another strength reinforcement partition walls which are joined at another strength reinforcement intersection point 312 of the strength reinforcement sides 212 of the strength reinforcement partition walls.

The strength reinforcement intersection points 312, at which the strength reinforcement sides 212 as the strength reinforcement partition walls are joined to each other, are arranged in the entire surface of a radial cross section of the honeycomb structure 1 when the honeycomb structure is cut in a direction which is perpendicular to an axial direction of the honeycomb structure 1.

A description will now be given of the explanation of the structure of the honeycomb structure 1 according to the first exemplary embodiment in detail.

As shown in FIG. 1, the honeycomb structure 1 is used as a catalyst support capable of supporting catalyst in order to purify exhaust gas emitted from an internal combustion engine of a motor vehicle. The honeycomb structure 1 is made of ceramics in which a primary component is cordierite. The honeycomb structure 1 has an outer diameter of 103 mm and a length of 105 mm in an axial direction of the honeycomb structure 1.

The outer peripheral side surface of the honeycomb structure 1 is covered with the outer peripheral wall 5. The outer peripheral wall 5 has a thickness of 65 μm. The inside of the outer peripheral wall 5 of the honeycomb structure 1 is composed of the partition walls 2 and the hexagonal cells 4. The partition walls 2 are arranged in a hexagonal lattice pattern on a cross section of the honeycomb structure 1. The hexagonal cells 4 are surrounded by the partition walls 2. That is, as shown in FIG. 2, each cell 4 is surrounded by the six partition walls 2 which are arranged in a hexagonal shape. A cell density of the hexagonal cells 4 is 750 cpsi. The cell density cpsi is defined as the number of the hexagonal cells 4 per unit square inch in the radial cross section of the honeycomb structure 1.

As shown in FIG. 2, the partition walls 2 have a plurality of the sides 21 of the partition walls 2. That is, the partition walls 2 are the sides to form the hexagonal cells 4. The sides 21 of the partition walls 2 are divides into the sides 21 of the basic partition walls and the strength reinforcement sides 212 as the strength reinforcement partition walls. Each of the strength reinforcement sides 212 as the strength reinforcement partition walls is thicker than each of the sides 211 of the basic partition walls. That is, some of the sides 21 of the partition walls are the strength reinforcement sides 212 of the strength reinforcement partition walls. A thickness of each of the strength reinforcement sides 212 is thicker than that of each of the sides 211 of the basis partition walls.

In the first exemplary embodiment, each of the sides 211 as the basic partition walls has a thickness of 63.5 μm. Each of the strength reinforcement sides 212 as the strength reinforcement partition walls has a thickness of 80 μm. That is, thickness of the strength reinforcement side 212 is approximately 1.26 times of the thickness of the side 211 as the basic partition wall.

The partition walls 2 have a plurality of intersection points 31. Three sides 21 of the partition walls are joined to each other at each intersection point 31. Some of the intersection points 31 of the partition walls are the strength reinforcement intersection points 312 of the strength reinforcement partition walls (or the strength reinforcement sides). The strength reinforcement sides 212 as the strength reinforcement partition walls are joined only at the corresponding intersection points 312, respectively.

That is, the strength reinforcement intersection points 312 of the strength reinforcement partition walls are some of the entire intersection points 31 of the partition walls. The three strength reinforcement sides 212 as the strength reinforcement partition walls are joined to each other at the corresponding strength reinforcement intersection point 312.

In the structure of the honeycomb structure 1, the strength reinforcement sides 212 as the strength reinforcement partition walls in one group which belongs to one strength reinforcement intersection point 312 are not in contacted with any strength reinforcement side 212 in another group which belongs to another strength reinforcement intersection point 312.

That is, the honeycomb structure 1 according to the first exemplary embodiment has the improved and novel structure in which a plurality of the strength reinforcement intersection points 312 are arranged at a regular interval on the surface of a radial cross section of the honeycomb structure in order to avoid the strength reinforcement sides 212 in one group belonging to one strength reinforcement intersection point 312 being connected to any each of the strength reinforcement sides 212 in another group belonging to another strength reinforcement intersection point 312.

Further, as shown in FIG. 2, the sides 21 of the partition walls are joined at the corresponding intersection points 31, respectively. Further, the strength reinforcement intersection points 312 of the strength reinforcement partition walls are alternately arranged on a radial cross section in one of three directions, X direction, Y direction and Z direction in which the sides 21 of the partition walls are formed.

As shown in FIG. 2 and FIG. 3, the strength reinforcement intersection points 312 of the strength reinforcement partition walls are arranged on the entire surface of a radial cross section of the honeycomb structure 1.

In the structure of the honeycomb structure 1 according to first exemplary embodiment, the connection lines L shown in FIG. 3 have a hexagonal shape. The strength reinforcement intersection points 312 are arranged in a predetermined regular pattern. The connection lines L are obtained by connecting the strength reinforcement intersection points 312 of the strength reinforcement partition walls. The strength reinforcement intersection points 312 of the strength reinforcement partition walls are arranged so that the radial cross section of the honeycomb structure 1 is divided into a plurality of hexagonal areas S by the strength reinforcement intersection points 312.

Further, as shown in FIG. 3, the facing sides, which face to each other in a hexagonal shape obtained by connecting the connection lines L, have a gap d within a range of 20 to 50 mm, where the connection lines L are obtained by connecting the strength reinforcement sides 212 as the strength reinforcement partition walls.

FIG. 3 shows the connection lines L in order to clearly show the arrangement pattern of the strength reinforcement intersection points 312 of the strength reinforcement partition walls on a radial cross section of the honeycomb structure 1 according to the first exemplary embodiment. That is, the strength reinforcement intersection points 312 of the strength reinforcement partition walls are arranged at a predetermined regular interval on the connection lines L shown in FIG. 3.

Further, catalyst (not shown) is supported in the cells, namely, on the surfaces of the partition walls of the honeycomb structure 1. The catalyst can purify exhaust gas emitted from an internal combustion engine of a motor vehicle. That is, catalyst is supported on the surfaces of the partition walls 2 (the side 21 of the partition walls).

In the first exemplary embodiment, catalyst is composed of platinum (Pt), palladium (Pd) and rhodium (Rh) as noble metal. The supported catalyst amount of the honeycomb structure 1 is 250 g/L.

Next, a description will now be given of a method of producing the honeycomb structure 1 according to the first exemplary embodiment of the present invention.

The honeycomb structure 1 having the improved structure previously described can be produced by the following manufacturing method. That is, cordierite raw material is extruded to make a mold body having a honeycomb structure. The mold body is cut into a plurality of parts. The cut molded body is dried and fired at a predetermine temperature over a predetermined time period. The above steps make the honeycomb structure 1 shown in FIG. 1.

In the above production method can use a metal die for use in the extrusion molding step. The metal die has a plurality of slit grooves. The pattern of the slit grooves corresponds to the shape of the sides 21 (which are composed of the sides 211 of the basic partition walls and the strength reinforcement sides 212 as the strength reinforced partition walls) of the partition walls 2 in the honeycomb structure 1. The slit grooves are formed in the metal die by using a laser beam processing.

Figure 4A:
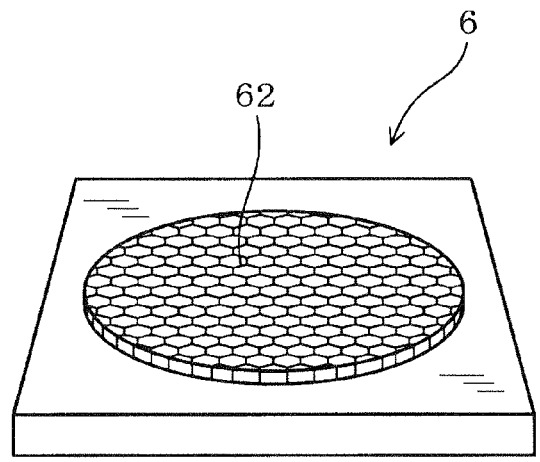
FIG. 4A is a view showing a metal die for use in extrusion molding of raw material so as to produce the honeycomb structure according to the first exemplary embodiment of the present invention.
Figure 4B:
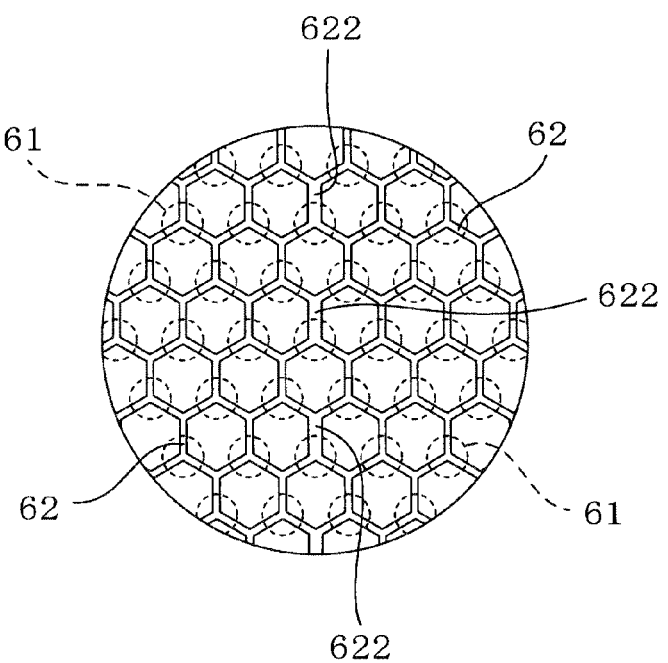
FIG. 4B is a view showing a relationship between feed holes and slit grooves in the metal die shown in FIG. 4A.

FIG. 4A is a view showing the metal die 6 for use in the extrusion molding process of extruding cordierite raw material so as to produce the honeycomb structure 1 according to the first exemplary embodiment of the present invention. FIG. 4B is a view showing a relationship between feed holes 61 and slit grooves 62 formed in in the metal die shown in FIG. 4A.

As shown in FIG. 4A and FIG. 4B, the first exemplary embodiment used the metal die 6 having the feed holes 61 and the slit grooves 62 formed in a hexagonal lattice pattern. The cordierite raw material is supplied to the metallic die 6 through the feed holes 61, and is extruded by the metal die 6 in order to produce the mold body of the honeycomb structure 1.

Figure 5A:
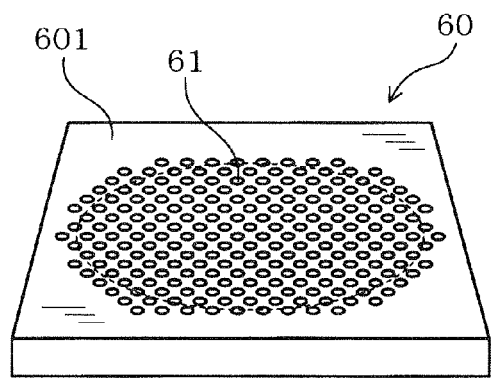
FIG. 5A, FIG. 5B and FIG. 5C are views showing steps of producing the metal die shown in FIG. 4A and FIG. 4B.
Figure 5B:
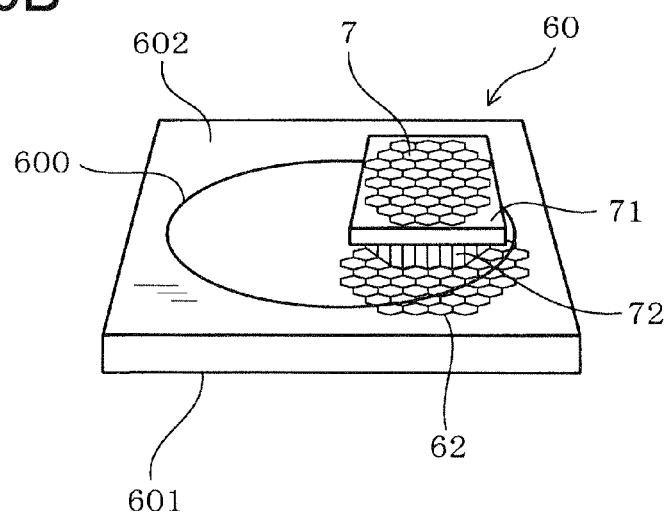
Figure 5C:
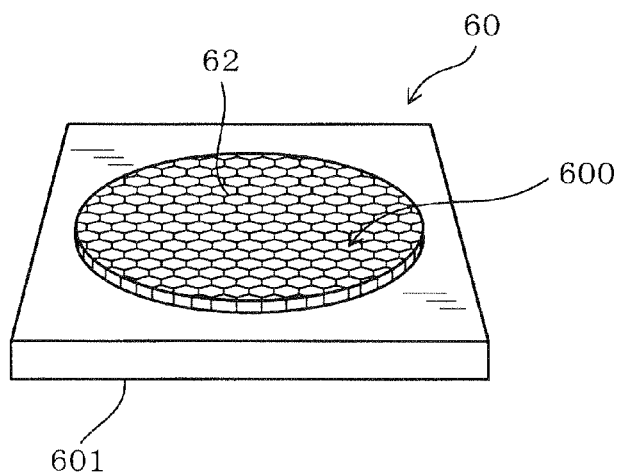

FIG. 5A, FIG. 5B and FIG. 5C are views showing steps of producing the metal die 6 shown in FIG. 4A and FIG. 4B.

The metal die 6 for use in the extrusion molding step is made by the following steps.

As shown in FIG. 5A, a plurality of feed holes 61 are formed at a predetermined pattern on one surface 601 of the metal plate 60 by using a drill.

Next, as shown in FIG. 5B, a plurality of the slit grooves 62 are formed on the other surface 602 of the metal plate 60 by an electrical discharging machine (EDM) having an electrical discharge electrode 7.

Figure 6:
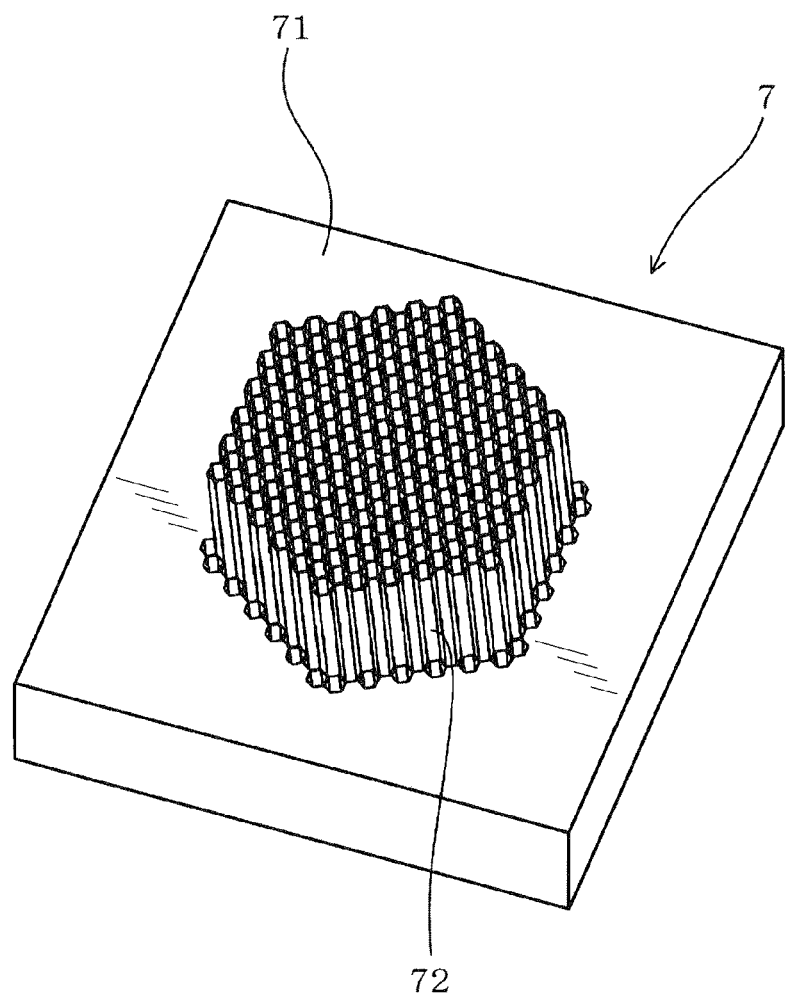
FIG. 6 is a perspective view showing electrodes of electrical discharge machining (EDM) to be used for producing the honeycomb structure according to the first exemplary embodiment of the present invention.

FIG. 6 is a perspective view showing the electrical discharge electrode 7 of the electrical discharge machining (EDM) to be used for producing the metal die 6. As shown in FIG. 6, the electrical discharge electrode 7 of the EDM is equipped with a base plate part 71 and an electrical discharge processing part 72. The electrical discharge processing part 72 is extruded from the base plate part 71. A cross section of the electrical discharge processing part 72 has a hexagonal lattice pattern. The entire of the electrical discharge processing part 72 has a hexagonal prism shape. The electrical discharge processing part 72 has a plurality of hexagonal parts which correspond to the arrangement pattern of the slit grooves 62.

Figure 7:
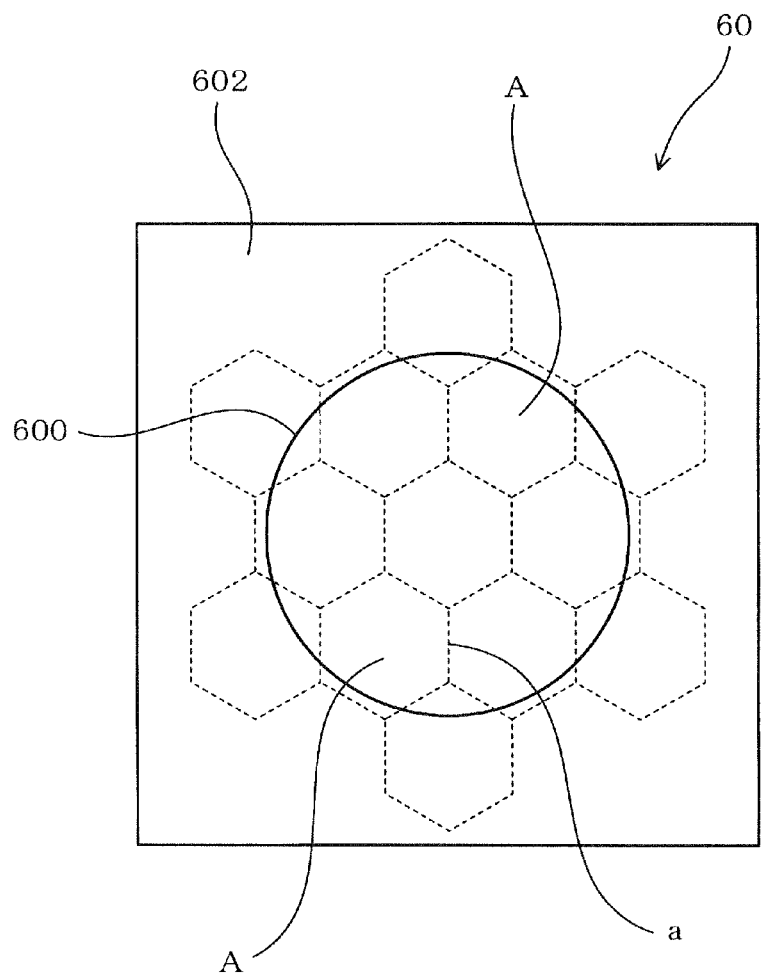
FIG. 7 is a view showing a part of a metal plate in which a plurality of the slit grooves is formed.

FIG. 7 is a view showing a part of the metal plate 60 in which a plurality of the slit grooves 62 is formed.

As shown in FIG. 7, the electrical discharge process using the electrical discharge electrode 7 of the electrical discharge machining (EDM) is applied to a plurality of processing areas A on the other surface 602 of the metal plate 60. Each of the processing area A has a hexagonal shape. All of the slit grooves 62 are formed on the slit groove formation part 600 on the other surface 602 of the metal plate 60. The metal die 6 is formed by the metal plate 60 having the above structure.

Figure 8:
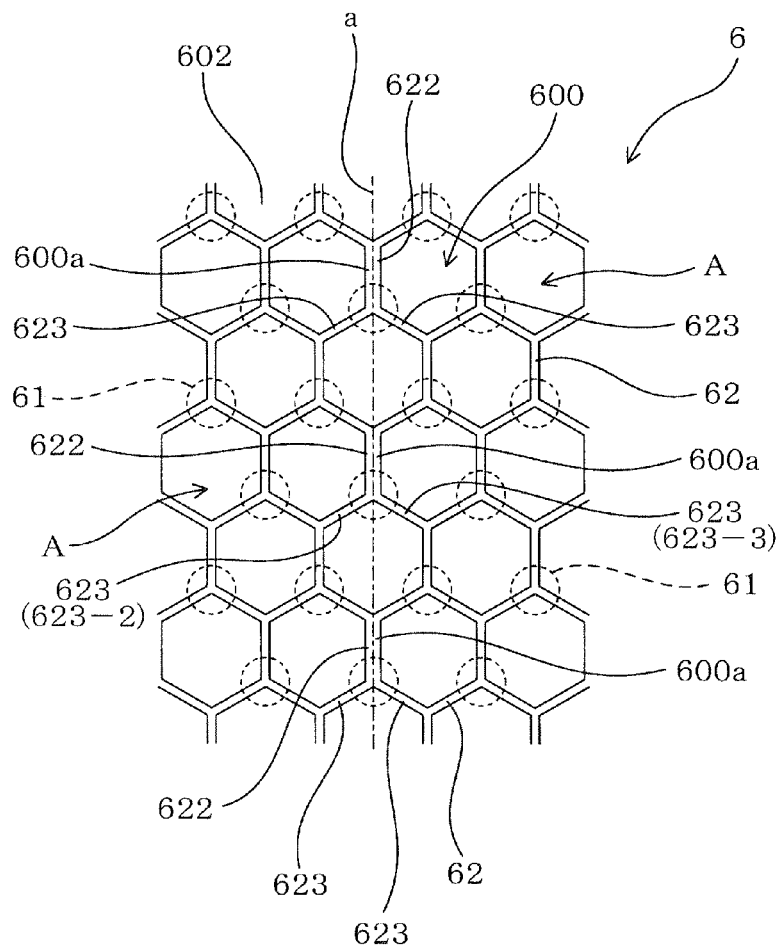
FIG. 8 is a view showing an overlapping part of the slit groove formation part on the metal plate as the metal die shown in FIG. 4A and FIG. 4B.

FIG. 8 is a view showing an overlapping part of the slit groove formation part 600 on the metal plate 60 as the metal die shown in FIG. 4A and FIG. 4B.

As shown in FIG. 8, expanded slit grooves 622 are formed in the slit groove formation part 600 on the surface of the metal plate 60 by laser processing or by using or the electrical discharge electrode 7 of the EDM. The expanded slit grooves 622 of the metal plate 60 correspond to the strength reinforcement sides 212 as the strength reinforcement partition walls in the partition walls of the honeycomb structure 1. The extrusion molding metal die 6 is produced by the above steps.

Finally, as shown in FIG. 5C, the outside part, which is outside of the slit groove formation part 600 on the other surface 602 of the metal plate 60, is eliminated so as to extrude the slit groove formation part 600 from the outside part on the other surface 602 of the metal plate 60.

The production of the extrusion molding metal die 6 shown in FIG. 4A and FIG. 4B is completed.

Figure 9:
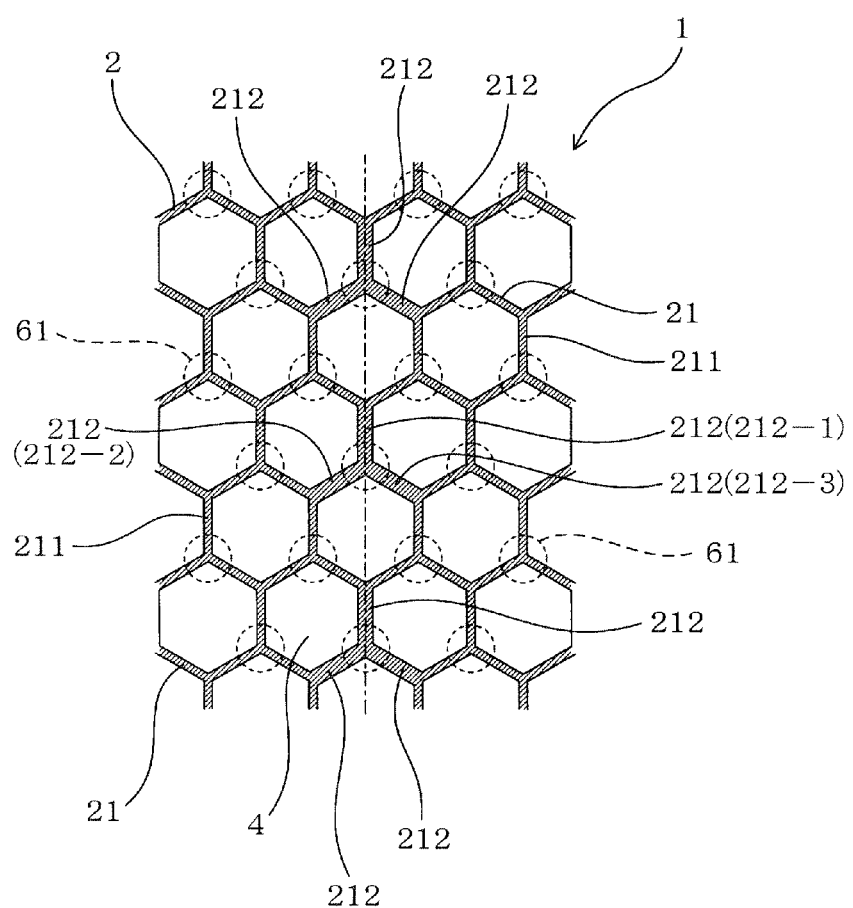
FIG. 9 is a view showing partition walls which are extruded through the slit grooves of the honeycomb structure formed in the metal die shown in FIG. 4A and FIG. 4B.

FIG. 9 is a view showing partition walls which are extruded through the slit grooves of the honeycomb structure formed in the metal die shown in FIG. 4A and FIG. 4B.

As shown in FIG. 9, when raw material of cordierite ceramics is extruded by using the extrusion molding metal die 6, the partition walls 21 of the honeycomb structure 1 are formed.

The strength reinforcement sides 212 as the strength reinforcement partition walls in the partition wall 21 are formed by the expanded slit grooves 622 formed in the metal plate 60. In particular, when one strength reinforcement side 212 (as the first side 212-1 shown in FIG. 9) of the strength reinforcement partition walls is observed, the flow of the extruded raw material can make the strength reinforcement sides 212 (212-2 and 212-3) as the strength reinforcement partition walls which are adjacent to the strength reinforcement side 212-1 as the strength reinforcement partition wall. That is, the strength reinforcement side 212-1 as the strength reinforcement partition walls shown in FIG. 9 corresponds to the expanded slit grove 622 shown in FIG. 8. Further, the strength reinforcement sides 212-2 and 212-2 as the strength reinforcement partition walls shown in FIG. 9 corresponds to the slit groves 623-2 and 623-3 shown in FIG. 8. The slit grooves 623-2 and 623-3 are not the expanded slit groove, and are adjacent to the expanded slit groove 622 in the metal die 6 shown in FIG. 8. In other words, the presence of the expanded slit groove 622 shown in FIG. 8 produces the strength reinforcement sides 212-2 and 212-3 in addition to the strength reinforcement side 212-1 as the strength reinforcement partition walls even if the slit grooves 623-2 and 623-3 of the metal die 6 shown in FIG. 8 are not the expanded slit groove. It is thereby possible to make the partition walls 2 having the structure shown in FIG. 2.

Next, a description will now be given of the actions and effects of the honeycomb structure 1 according to the first exemplary embodiment of the present invention.

In the improved and novel structure of the honeycomb structure 1 according to the first exemplary embodiment, some of the strength reinforcement intersection points 31 of the partition walls 2 are the strength reinforcement intersection points 312 of the strength reinforcement partition walls. The strength reinforcement sides 212 as the strength reinforcement partition walls are joined to each other at the corresponding intersection point 312. That is, in the structure of the honeycomb structure 1 according to the first exemplary embodiment, the strength reinforcement intersection points 312 of the strength reinforcement partition walls are some of the intersection points 31 of the partition walls 2, and the three strength reinforcement sides 212 as the strength reinforcement partition walls are joined to each other at the corresponding intersection point 312. Each of the strength reinforcement sides 212 as the strength reinforcement partition walls is thicker than the side of the partition wall 2 other than the strength reinforcement partition walls. This structure makes it possible to increase the entire strength of the honeycomb structure 1.

The presence of the strength reinforcement intersection points 312 and the strength reinforcement sides 212 make it possible to increase the entire strength of the honeycomb structure 1. It is possible to suppress influence of erosion phenomenon (abrasion and damage) caused by collision of foreign substances contained in exhaust gas with the honeycomb structure 1. This makes it possible to increase the anti-erosion effect and the durability of the honeycomb structure 1.

In the structure of the honeycomb structure 1, the strength reinforcement sides 212 as the strength reinforcement partition walls, which are joined to the corresponding intersection point 312 of the strength reinforcement partition walls, are not joined to the strength reinforcement sides 212 which are joined to another intersection point 312 of the strength reinforcement partition walls. That is, each of the three strength reinforcement sides 212 joined to each other at one strength reinforcement intersection point 312 is not continuously connected to each of the three strength reinforcement sides 212 joined to another intersection point 312 of the strength reinforcement partition walls. The honeycomb structure 1 according to the first exemplary embodiment is formed so that the three strength reinforcement sides 212 in one group joined to each other at the corresponding intersection point 312 of the strength reinforcement partition walls are not sequentially arranged and connected to the three strength reinforcement sides 212 in another group joined to each other at another corresponding intersection point 312.

Still further, the strength reinforcement intersection points 312 of the strength reinforcement partition walls are arranged on the entire area of a radial cross section of the honeycomb structure 1. That is, the first exemplary embodiment of the present invention does not avoid having the structure in which the strength reinforcement sides 212 joined to the corresponding intersection points 312 of the strength reinforcement partition walls are formed on a concentrated area on the radial cross section of the honeycomb structure 1.

The formation of the strength reinforcement sides 212 as the strength reinforcement partition walls in the honeycomb structure 1 increases the entire strength and the anti-erosion capability of the honeycomb structure 1, and suppresses increasing of the entire weight and the heat capacity of the honeycomb structure 1.

In particular, when the honeycomb structure 1 supports catalyst on the surfaces of the partition walls 2, it is possible to avoid that catalyst is clogged in the inside of the cells 4 and to avoid the pressure loss of the honeycomb structure 1 from being increased. This prevents the exhaust gas purifying capability from being deteriorated. Furthermore, it is possible to provide a rapid activation of catalyst supported in the honeycomb structure 1 because of suppressing the increase of the pressure loss and heat capacity.

The strength reinforcement intersection points 312 of the strength reinforcement partition walls are arranged alternately on the intersection points 31 of the partition walls in one of the three directions X, Y and Z on a radial cross section of the honeycomb structure 1. The sides of the partition walls, which contain the strength reinforcement sides as the strength reinforcement partition walls, are arranged on the three directions X, Y and Z, and the three sides 21 of the partition walls formed on the three directions X, Y and Z are joined at the corresponding intersection point 31. This improved and novel structure of the honeycomb structure 1 makes it possible to increase the entire strength and anti-erosion capability while suppressing the pressure loss and the entire weight (which corresponds to the heat capacity) of the honeycomb structure 1 from being increased.

The honeycomb structure 1 according to the first exemplary embodiment has the improved and novel structure in which the strength reinforcement intersection points 312 of the strength reinforcement partition walls are arranged in a hexagonal lattice pattern on the entire surface of a radial cross section of the honeycomb structure 1. Further, the strength reinforcement intersection points 312 of the strength reinforcement partition walls are arranged so as to divide the entire area of a radial cross section of the honeycomb structure 1 into a plurality of the areas S. This structure makes it possible to prevent abrasion and damaged area caused by erosion phenomenon from being expanded by the presence of the strength reinforcement sides 212 as the strength reinforcement partition walls which are joined to each other at the corresponding strength reinforcement intersection points 312 formed at the boundary (or on the connection lines L) of each of the divided parts.

In each hexagonal shape formed by connecting the strength reinforcement intersection points 312 on a radial cross section, the facing sides have a gap within a range of 20 to 50 mm. This structure makes it possible to adequately increase the entire strength and anti-erosion capability of the honeycomb structure and suppresses the pressure loss and the entire weight (or the heat capacity) from being increased.

The honeycomb structure 1 according to the first exemplary embodiment has the improved and novel structure in which each of the strength reinforcement sides 212 as the strength reinforcement partition walls has a thickness within a range of 1.1 times to 1.6 times of the thickness of each of the sides 211 of basic partition walls. This structure makes it possible to have the following features simultaneously, the feature to suppress the pressure loss and the entire weight of the honeycomb structure from being increased, and the feature to increase the entire strength and anti-erosion capability of the honeycomb structure.

The honeycomb structure 1 according to the present invention supports catalyst which is capable of purifying exhaust gas emitted from an internal combustion engine. Specifically, the catalyst is supported on the surface of the partition walls and the strength reinforcement partition walls of the cells. The structure of the honeycomb structure 1 makes it possible to prevent exhaust gas purifying capability from being decreased. Because the presence of clogged cells and the increase of the pressure loss decrease the exhaust gas purifying capability of the honeycomb structure 1, the suppression of increasing of the pressure loss and entire weight (heat capacity) provides a speedy activation of catalyst supported on the surfaces of the cells in the honeycomb structure.

As previously described, the first exemplary embodiment provides the honeycomb structure 1 having the increased strength and anti-erosion capability of the honeycomb structure 1 while suppressing the pressure loss and the weight (heat capacity) from being increased.

Second Exemplary Embodiment

A description will be given of a second exemplary embodiment of the present invention with reference to FIG. 10 to FIG. 18. The secondary exemplary embodiment executes the evaluation of characteristics (the pressure loss, the anti-erosion capability, and the function to purify exhaust gas) of various types of honeycomb structures which contain the honeycomb structure 1 according to the first exemplary embodiment previously described.

The secondary exemplary embodiment prepared three honeycomb structures (as test samples E1, E2 and E3) and two conventional structures (as comparison samples C1 and C2).

The test samples E1, E2, E3 and the comparison samples C1 and C2 have a basis structure, for example the structure shown in FIG. 1. That is, each of the test samples E1, E2, E3 and the comparison samples C1 and C2 is composed of a plurality of the cells 4 and the cylindrical outer peripheral wall 5. The cell 4 is surrounded by the partition walls 2. The partition walls 2 are arranged in a hexagonal lattice pattern. The outer peripheral surface is covered with the cylindrical outer peripheral wall 5. Each of the test samples E1, E2, E3 and the comparison samples C1 and C2 has a diameter of 103 mm, a longitudinal length of 105 mm, and a cell density of 750 cpsi.

Next, a description will now be given of a structural difference between the test samples E1, E2, E3 and the comparison samples C1 and C2.

Figure 10:
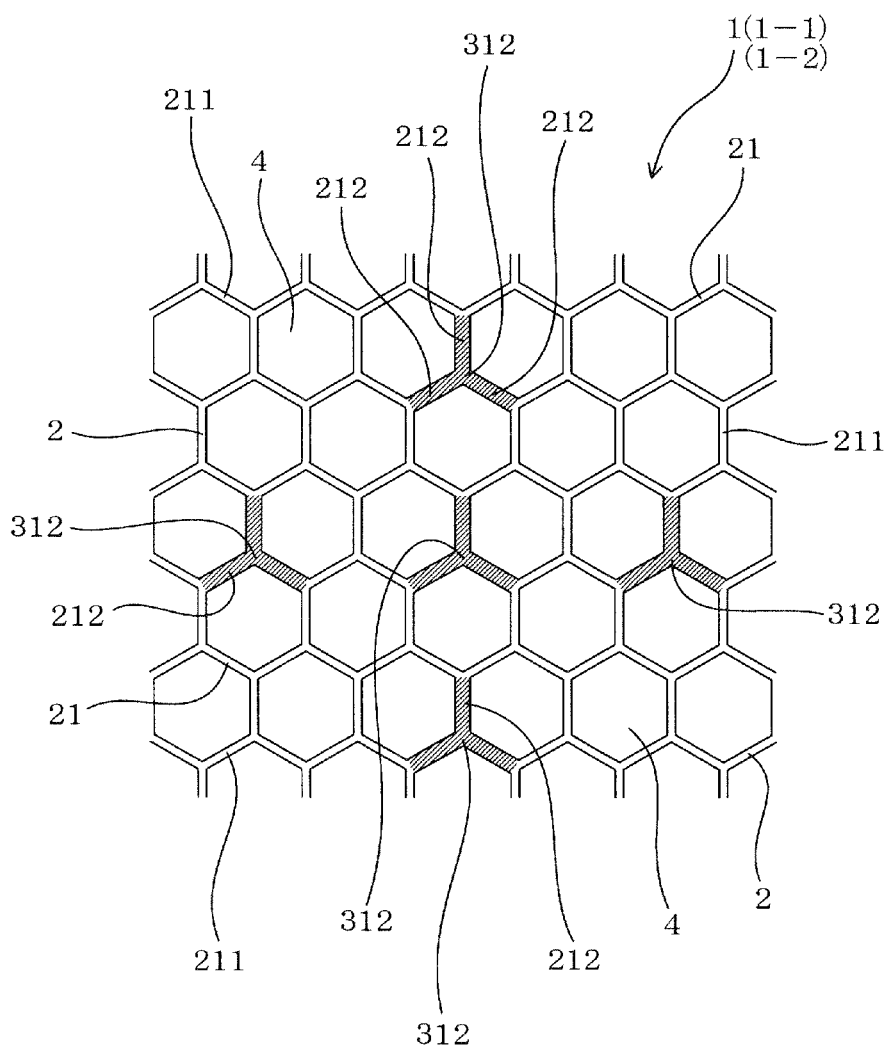
FIG. 10 is a view showing a part of a radial cross section of test samples E1 and E2 used in the second exemplary embodiment.
Figure 11:
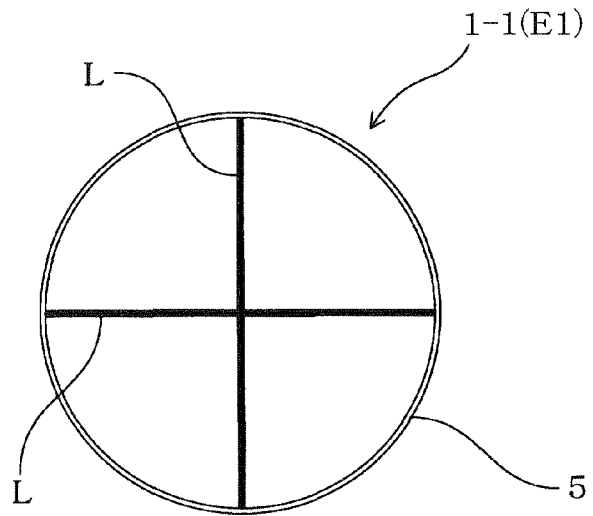
FIG. 11 is a view showing a radial cross section of the test sample E1 used in the second exemplary embodiment.

FIG. 10 is a view showing a radial cross section of each of the test samples E1 and E2 used in the second exemplary embodiment. FIG. 11 is a view showing a radial cross section of the test sample E1 used in the second exemplary embodiment.

As shown in FIG. 10 and FIG. 11, the test sample E1 has the structure 1 (1-1) in which the strength reinforcement intersection points 312 of the strength reinforcement partition walls and the strength reinforcement sides 212 as the strength reinforcement partition walls are arranged in a cross shape on two connection lines L so that the two connection lines L make a single cross shape and the two connection lines L are perpendicular to each other.

Figure 12:
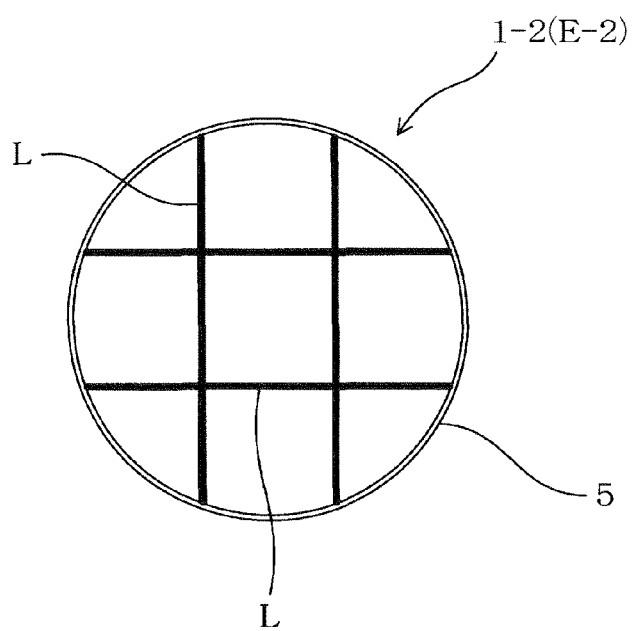
FIG. 12 is a view showing a radial cross section of the test sample E2 used in the second exemplary embodiment.

FIG. 12 is a view showing a radial cross section of the test sample E2 used in the second exemplary embodiment.

As shown in FIG. 10 and FIG. 12, the test sample E2 has the structure 1 (1-2) in which the strength reinforcement intersection points 312 of the strength reinforcement partition walls and the strength reinforcement sides 212 as the strength reinforcement partition walls are arranged in a square lattice shape on four connection lines L.

The test sample E3 has the structure 1 shown in FIG. 2 and FIG. 3, as previously described. That is, as shown in FIG. 2 and FIG. 3, the test sample E3 has the structure 1 in which the strength reinforcement intersection points 312 as the strength reinforcement partition walls and the strength reinforcement sides 212 (as the strength reinforcement partition walls) are arranged on a plurality of the connection lines L to form a hexagonal lattice pattern. In each of the test samples E1, E2, E3, each side 211 of the basic partition wall has a thickness of 63.5 μm and each strength reinforcement side 212 as the strength reinforcement partition wall has a thickness of 80 μm.

Figure 13:
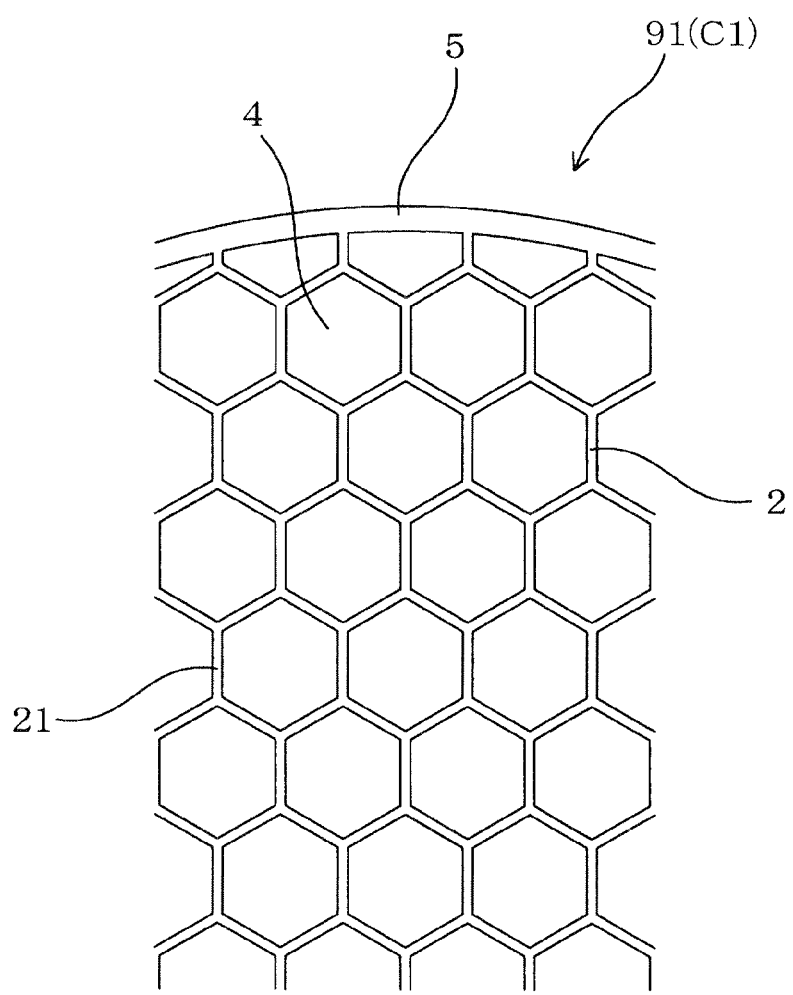
FIG. 13 is a view showing a radial cross section of a comparison sample C1 used in the second exemplary embodiment.

FIG. 13 is a view showing a radial cross section of the comparison sample C1 used in the second exemplary embodiment. As shown in FIG. 13, each of the partition walls 2, namely, each of the sides 21 of the partition walls 2 has the same thickness. The side of the partition wall 2 has a thickness of 63.5 μm.

Figure 14:
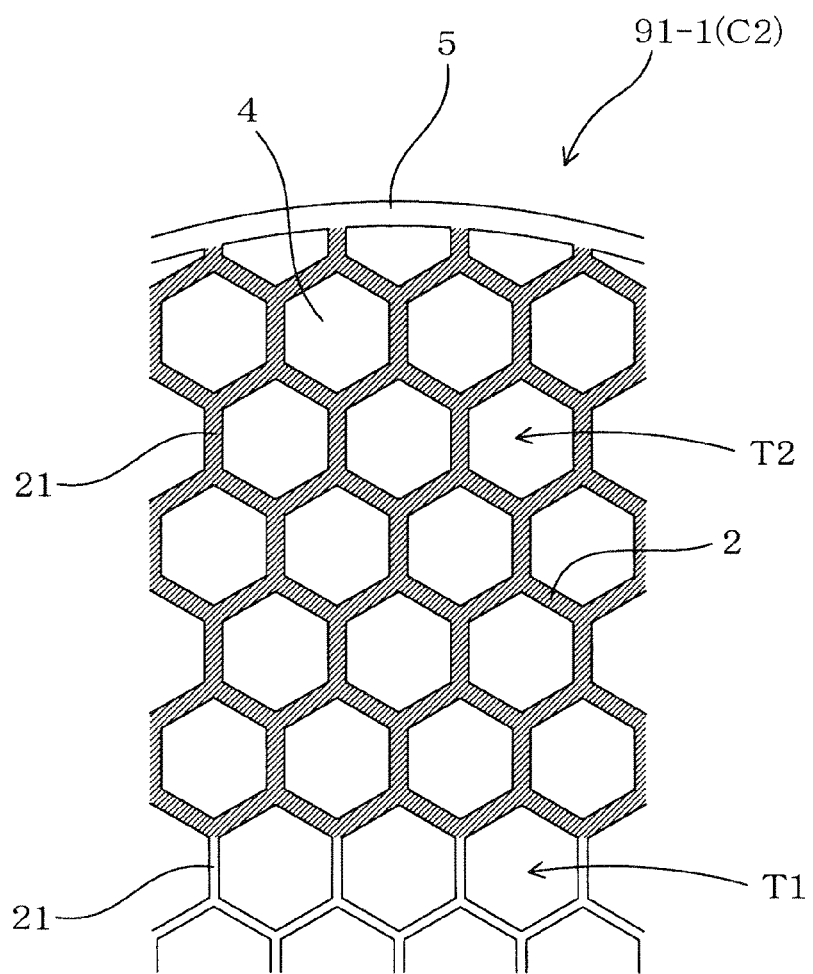
FIG. 14 is a view showing a radial cross section of a comparison sample C2 used in the second exemplary embodiment.
Figure 15:
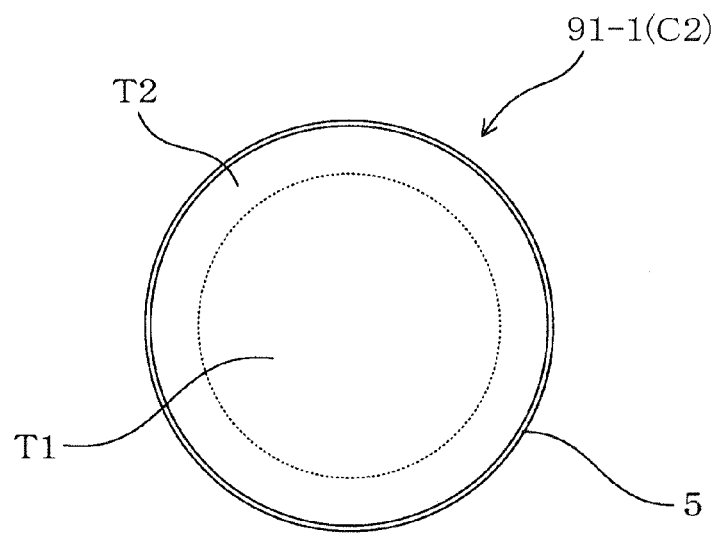
FIG. 15 is a view showing a radial cross section of the test sample C2 used in the second exemplary embodiment.

FIG. 14 and FIG. 15 are views showing a radial cross section of a comparison sample C2 used in the second exemplary embodiment. FIG. 15 is a view showing a radial cross section of the test sample C2 used in the second exemplary embodiment. As shown in FIG. 14 and FIG. 15, the comparison sample C2 as a honeycomb structure 91-1 has a basic strength area T1 and a strength reinforcement area T2. In particular, the strength reinforcement area T2 is formed within a range of 0 to 5 mm measured from the outer peripheral wall 5 of the comparison sample C2. In the strength reinforcement area T2, all of the sides 21 of the partition walls have a thickness which is thicker than that of the sides of the partition walls in the basic strength area T1 other than the strength reinforcement area T2. Each side 21 of the partition wall in the basic strength area T1 has a thickness of 63.5 μm. On the other hand, each side 21 of the strength reinforcement partition wall in the strength reinforcement area T2 has a thickness of 90 μm.

A description will now be given of the evaluation method used in the secondary exemplary embodiment.

The evaluation of the pressure loss of each of the samples was executed by the following steps and evaluation results will be considered.

First of all, catalyst was supported by each of the test samples E1, E2, E3 and the comparison samples C1 and C2. Air flow of 7000 L/minute was supplied to each of the test samples E1, E2, E3 and the comparison samples C1 and C2. A difference in pressure at the inlet and at the outlet of each of the test samples E1, E2, E3 and the comparison samples C1 and C2 was detected. The pressure difference corresponds to the pressure loss of each sample.

The anti-erosion capability of each sample was executed by comparing an erosion amount (amount of wind erosion) of each sample.

In the detection of the erosion amount, the weight of each of the test samples E1, E2, E3 and the comparison samples C1 and C2 without supporting any catalyst was detected. Next, a shot nozzle injected glass beads made of fused silica. Each fused silica as a glass bead had an average particle size of 120 μm. The shot nozzle for injecting glass beads to each sample was located 150 mm height apart from the end surface of each sample and 150 mm shifted from the center of the end surface of each sample toward an outside direction in a diameter of each sample.

In the evaluation of each of the test samples E1, E2, E3 and the comparison samples C1 and C2 in the second exemplary embodiment, the shot nozzle injected glass beads at an injection pressure within a range of 1.0 to 2.0 kg/cm2, in the injection angle of 90° (see FIG. 19A, which will be explained later) over 30 seconds.

Next, the weight of each of the test samples E1, E2, E3 and the comparison samples C1 and C2 was detected again. A difference in weight of the sample before the injection of the glass beads and after the injection was measured. The difference in weight corresponds to the erosion amount of each of the test samples E1, E2, E3 and the comparison samples C1 and C2.

The evaluation of the function to purify exhaust gas was executed by comparing a purifying rate of each of the test samples E1, E2, E3 and the comparison samples C1 and C2.

In the evaluation test, each of the test samples E1, E2, E3 and the comparison samples C1 and C2 was mounted on an exhaust gas pipe of a gasoline motor vehicle with 2000 cc engine displacement. Each of the test samples E1, E2, E3 and the comparison samples C1 and C2 supported 250 g/L catalyst therein. The gasoline motor vehicle was running in LA#4 mode in order to detect hydro carbon (HC) purifying rate. The HC purifying rate was detected in LA#4 mode. In the evaluation test, the HC purifying rate of each of the test samples E1, E2, E3 and the comparison samples C1 and C2 was calculated on the basis of the HC purifying rate (HC purifying rate=1) of the test sample E1.

The above LA#4 mode is a U.S. test mode defined by Federal test procedure FTP75 used in the United State of America. The value BAG1 indicates a value obtained from exhaust gas emitted from the internal combustion engine of the gasoline motor vehicle in cold start phase.

Next, a description will now be given of the evaluation results in the second exemplary embodiment with reference to FIG. 16 to FIG. 18.

Figure 16:
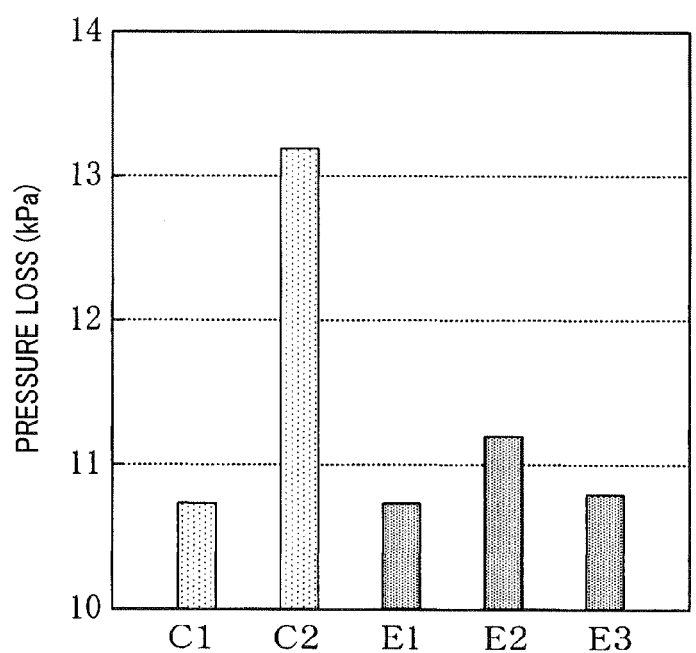
FIG. 16 is a graph showing a comparison result of the pressure loss of test samples E1, E2 and E3 and the comparison samples C1 and C2 used in the second exemplary embodiment of the present invention.

FIG. 16 is a graph showing a comparison result regarding the pressure loss (kPa) of the test samples E1, E2 and E3 and the comparison samples C1 and C2 used in the second exemplary embodiment of the present invention.

Because the test sample C2 had the structure in which the strength reinforcement sides 21 as the strength reinforcement partition walls having a thick thickness were formed in the concentrated area, namely, in the strength reinforcement area T2, the test sample C2 had a large pressure loss when compared with the other samples. On the other hand, as shown in the graph of FIG. 16, each of the test samples E1, E2 and E3 as the honeycomb structures 1, 1-2, 1-3, respectively, according to the present invention has almost the same pressure loss of the comparison sample C1, where the comparison sample C1 had not any strength reinforcement partition walls.

Figure 17:
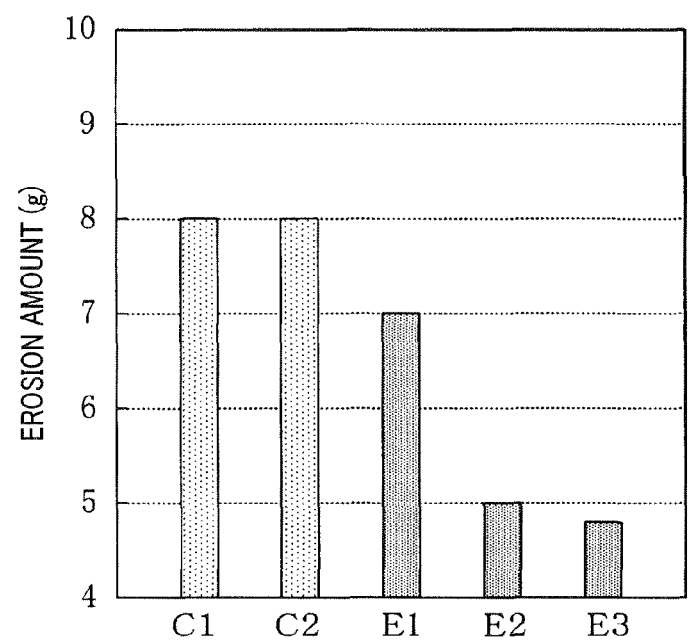
FIG. 17 is a graph showing a comparison result of the erosion amount of the test samples E1, E2 and E3 and the comparison samples C1 and C2 used in the second exemplary embodiment of the present invention.

FIG. 17 is a graph showing the comparison result of the erosion amount of the test samples E1, E2 and E3 and the comparison samples C1 and C2 used in the second exemplary embodiment of the present invention.

As can be understood from the comparison result shown in FIG. 17, the erosion amount of each of the test samples E1, E2 and E3 according to the present invention is smaller than the erosion amount of each of the comparison samples C1 and C2. In particular, because each of the test samples E2 and E3 has the structure in which the strength reinforcement intersection points 312 of the strength reinforcement partition walls are arranged in a lattice arrangement so as to divide the entire area on a radial cross section of each of the test samples E2 and E3 into a plurality of the areas S, it is possible to prevent the area of abrasion and damage from being expanded, and to drastically decrease the erosion amount.

Figure 18:
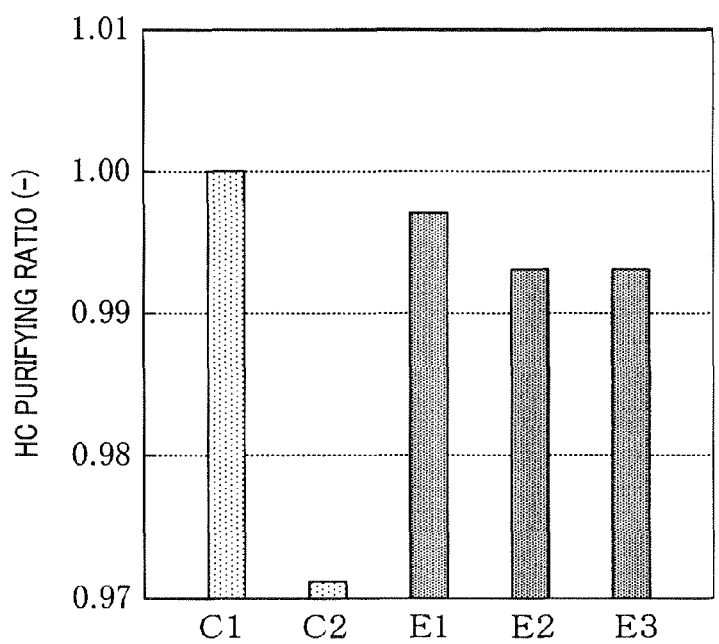
FIG. 18 is a graph showing a comparison result of the HC (Hydro Carbon) purifying ratio between the test samples E1, E2 and E3 and the comparison samples C1 and C2 used in the second exemplary embodiment of the present invention.

FIG. 18 is a graph showing the comparison result of the HC purifying ratio between the test samples E1, E2 and E3 and the comparison samples C1 and C2 used in the second exemplary embodiment of the present invention.

Because the comparison sample C2 has the structure in which the strength reinforcement sides 21 as the strength reinforcement partition walls having a thick thickness were formed in the concentrated area, namely, in the strength reinforcement area T2, it is difficult to obtain a rapid activation of catalyst, the comparison sample C2 has a low HC purifying ratio.

On the other hand, as shown in the graph of FIG. 18, each of the test samples E1, E2 and E3 according to the present invention has almost the same HC purifying ratio of the comparison sample C1, where the comparison sample C1 had not any strength reinforcement partition walls.

Accordingly, it is possible for the honeycomb structure 1, 1-1, 1-2 (as the test samples E1, E2 and E3) according to the present invention to increase the entire strength and the anti-erosion capability and suppresses the pressure loss from being increased by the formation of the strength reinforcement sides as the strength reinforcement partition walls, and suppresses the entire weight (heat capacity) from being increased. This further suppresses the rapid activation of catalyst from being delayed, and the HC purifying capability from being decreased.

Third Exemplary Embodiment

A description will be given of a third exemplary embodiment of the present invention with reference to FIG. 19A, FIG. 19B, FIG. 19C and FIG. 20. The third exemplary embodiment executes the evaluation of anti-erosion capability as one of the characteristics of the honeycomb structure.

Figure 19A:
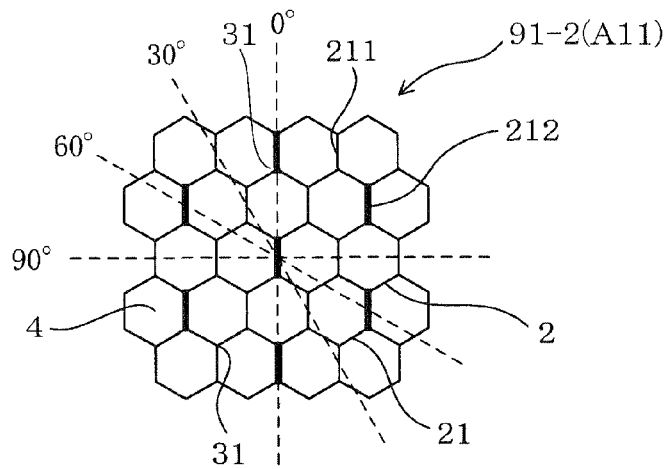
FIG. 19A, FIG. 19B and FIG. 19C are views showing a cross section of each of test samples A11, A12 and A13 used in a third exemplary embodiment of the present invention.
Figure 19B:
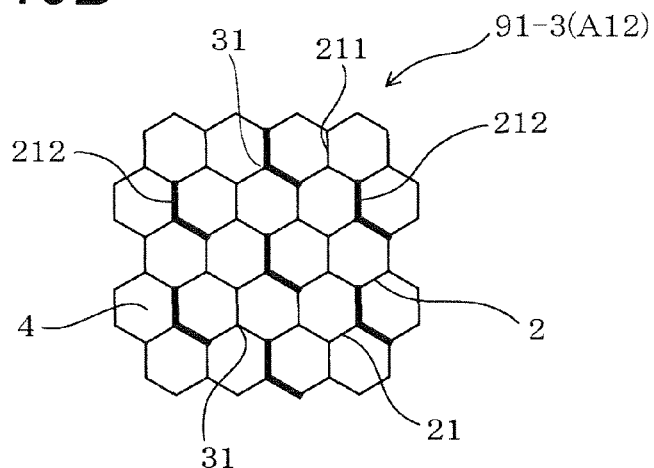
Figure 19C:
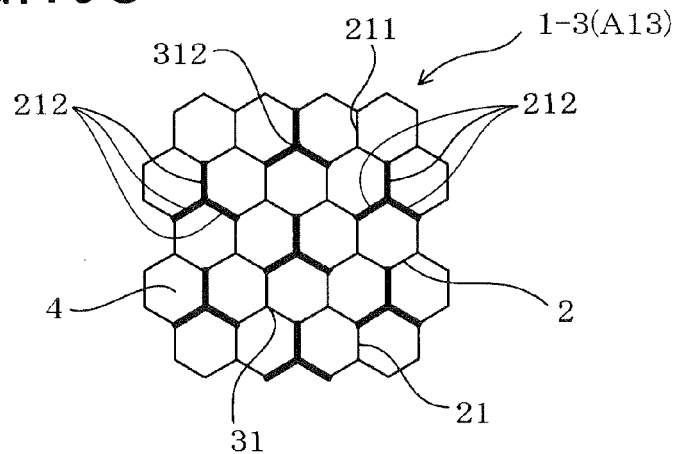

FIG. 19A, FIG. 19B and FIG. 19C are views showing a cross section of each of comparison samples A11 and A12 and a test sample A13 used in the third exemplary embodiment of the present invention.

As shown in FIG. 19A, FIG. 19B and FIG. 19C, the third exemplary embodiment prepared and used three samples A11, A12 and A13.

As shown in FIG. 19A, the comparison sample A11 is a honeycomb structure 91-2 having a structure in which one strength reinforcement side 212 (designated by the solid lines) in three sides of the partition walls, which are joined at the corresponding intersection point 31 of the three partition walls, is a strength reinforcement side 212 of the three strength reinforcement partition walls.

As shown in FIG. 19B, the comparison sample A12 is a honeycomb structure 91-3 having a structure in which two strength reinforcement sides 212 (designated by the solid lines) in three sides of the partition walls, which are joined at the corresponding intersection point 31 of the three partition walls, are strength reinforcement sides 212 of the three strength reinforcement partition walls.

As shown in FIG. 19C, the test sample A13 is a honeycomb structure 1-3 having the structure in which three strength reinforcement sides 212 of the partition walls, which are joined at the corresponding intersection point 312 of the three partition walls, are the strength reinforcement sides 212 (designated by the solid lines) of the three strength reinforcement partition walls (which have the same structure shown in FIG. 2).

The third exemplary embodiment used the same method of the second exemplary embodiment previously described, which evaluates the anti-erosion capability of each sample.

The third exemplary embodiment executed the evaluation under the following evaluation conditions:
Injection pressure of 1.0 kgf/cm$^2$;
Injection period of 30 seconds;
Fused silica having an average particle size of 120 μm; and
Injection directions of 0°, 30°, 60° and 90° (see FIG. 19A).

The test sample A13 and the comparison samples A11 and A12 used in the third exemplary embodiment had the basic structure shown in FIG. 1 other than the structure previously explained.

Each of the comparison samples A11 and A12 and the test sample A13 had an outer diameter of 103 mm, a length of 105 mm, a thickness of each side of a basic partition wall of 68 μm, a thickness of each side of the strength reinforcement partition wall of 92 μm, a cell density of 600 cpsi, a porosity of 28%, and an average pore diameter of 6.5 μm. None of the comparison samples A11 and A12 and the test sample A13 supported any catalyst.

Next, a description will now be given of the evaluation results according to the third exemplary embodiment.

Figure 20:
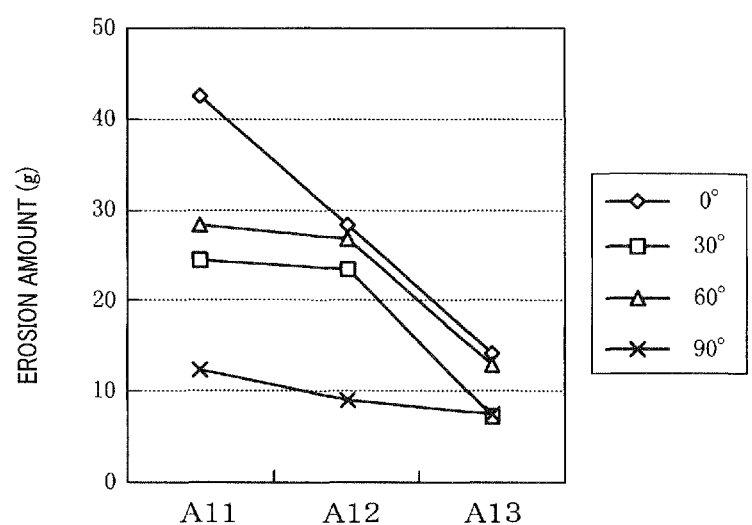
FIG. 20 is a graph showing a comparison result of the erosion amount of each of the comparison samples A11 and A12 and the test sample A13 used in the third embodiment of the present invention.

FIG. 20 is a graph showing a comparison result of erosion amount (g) of each of the comparison samples A11 and A12 and the test sample A13 used in the third embodiment of the present invention.

As clearly shown by the evaluation result of FIG. 20, the test sample A13 according to the present invention has an erosion amount which is smaller than the erosion amount of each of the comparison samples A11 and A12. Further, the test sample A13 according to the present invention has a low influence of the injection direction when compared with that of each of the comparison samples A11 and A12.

It can be understood that the test sample A13 as the honeycomb structure 1-3 according to the present invention has a superior anti-erosion capability because of having the same structure shown in FIG. 2, namely, having the strength reinforcement sides 212 as the three strength reinforcement partition walls.

Fourth Exemplary Embodiment

A description will be given of a fourth exemplary embodiment of the present invention with reference to FIG. 21A, FIG. 21B, FIG. 21C, FIG. 22, and FIG. 23. The fourth exemplary embodiment executes the evaluation of anti-erosion capability and a pressure loss as the characteristics of the honeycomb structure.

Figure 21A:
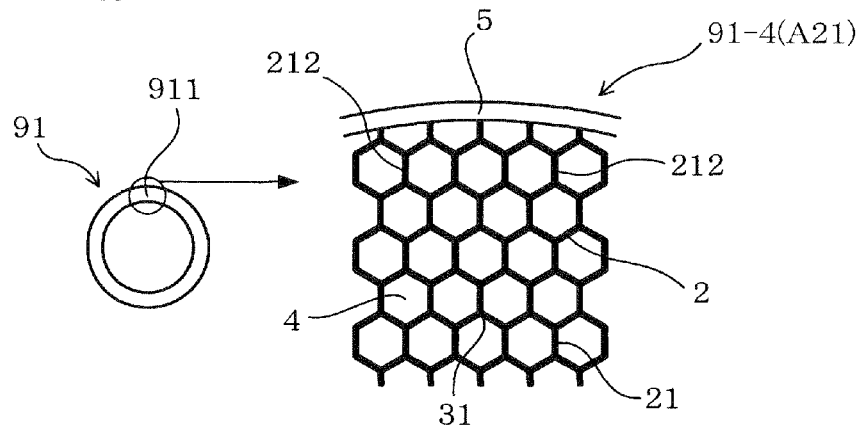
FIG. 21A, FIG. 21B and FIG. 21C are views showing a cross section of each of test samples A21, A22 and A23 used in a fourth exemplary embodiment of the present invention.
Figure 21B:
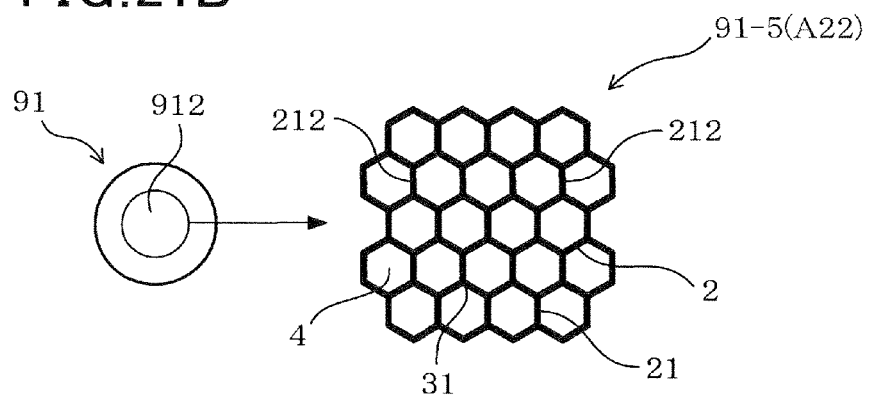
Figure 21C:
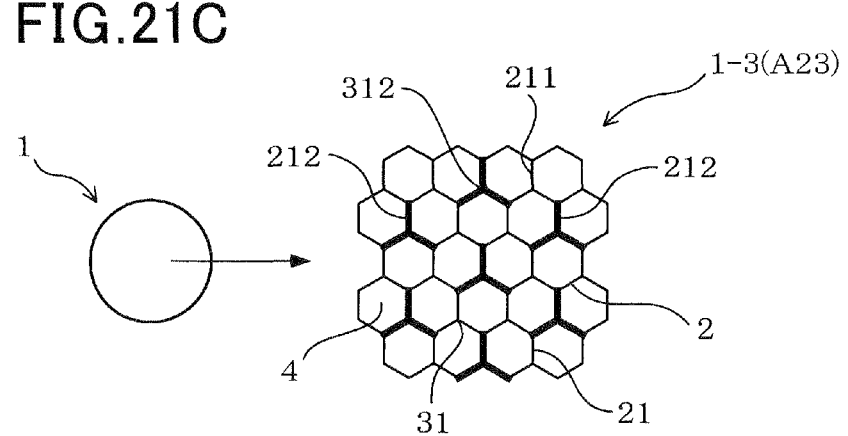

FIG. 21A, FIG. 21B and FIG. 21C are views showing a cross section of each of comparison samples A21, A22 and a test sample A23 used in a fourth exemplary embodiment of the present invention.

The fourth exemplary embodiment prepared and used the test sample A23 and the two comparison samples A21 and A22.

As shown in FIG. 21A, the comparison sample A21 is a honeycomb structure 91-4 having a structure in which the strength reinforcement sides 212 as the strength reinforcement partition walls (designated by the solid lines) are formed in an outer peripheral area in the radial cross section of the comparison sample A21. In the outer peripheral area, ten cells are formed from the outer peripheral wall 5 toward the central part of the radial cross section.

As shown in FIG. 21B, the comparison sample A22 is a honeycomb structure 91-5 having a structure in which the strength reinforcement sides 212 as the strength reinforcement partition walls (designated by the solid lines) are formed in a central circle area in the radial cross section of the comparison sample A22. The central circle area is within 25 mm radius measured from the central point of the radial cross section.

As shown in FIG. 21C, the test sample A23 is a honeycomb structure 1-3 having the structure in which three strength reinforcement sides 212 as the partition walls, which are joined at the corresponding intersection point 312 of the three partition walls, are the strength reinforcement sides 212 (designated by the solid lines) as the three strength reinforcement partition walls (which have the same structure shown in FIG. 2).

The forth exemplary embodiment used the same method of the second exemplary embodiment previously described, which evaluates the anti-erosion capability of each sample.

The fourth exemplary embodiment executed the evaluation of the anti-erosion capability under the following evaluation conditions:
Injection pressure of 1.0 kgf/cm$^2$;
Injection period of 30 seconds;
Fused silica having an average particle size of 120 μm; and
Injection direction of 90° (see FIG. 19A).

The injection area from the injection nozzle was one of selected from the central area (within approximately 30 mm measured from the central point of a radial cross section of each sample, as shown in FIG. 21B) and the outside area (within approximately 35 cells inside measured from the outer peripheral wall 5 shown in FIG. 21A).

The test sample A23 and the comparison samples A21 and A22 used in the evaluation of the anti-erosion capability had the basic structure shown in FIG. 1 other than the structure previously explained.

Each of the comparison samples A21 and A22 and the test sample A23 used in the evaluation of the anti-erosion capability had an outer diameter of 103 mm, a length of 110 mm, a thickness of each side of a basic partition wall of 70 μm, a thickness of each side of the strength reinforcement partition wall of 100 μm, a cell density of 600 cpsi, a porosity of 30%, and an average pore diameter of 5.8 μm. None of the comparison samples A21 and A22 and the test sample A23 supported any catalyst.

The fourth exemplary method used the same method of the second exemplary embodiment, as previously described, which evaluates the pressure loss of each sample. That is, the fourth exemplary method used the evaluation condition of air flow rate of 7000 L/minute. Air flow of 7000 L/minute was supplied to each of the comparison samples A21 and A22, and the test samples A23. A difference in pressure at the inlet and at the outlet of each of the comparison samples A21 and A2 and the test sample A23 was detected. The pressure difference corresponds to the pressure loss of each sample.

The test sample A23 and the comparison samples A21 and A22 used in the evaluation of the pressure loss had the basic structure shown in FIG. 1 other than the structure previously explained.

Each of the comparison samples A21 and A22 and the test sample A23 used in the evaluation of the pressure loss had an outer diameter of 103 mm, a length of 110 mm, a thickness of each side of a basic partition wall of 70 μm, a thickness of each side of the strength reinforcement partition wall of 100 μm, a cell density of 600 cpsi, a porosity of 30%, an average pore diameter of 5.8 μm, and a supported catalyst amount of 250 g/L.

Next, a description will now be given of the evaluation results of the characteristics of each sample regarding the anti-erosion capability and the pressure loss.

Figure 22:
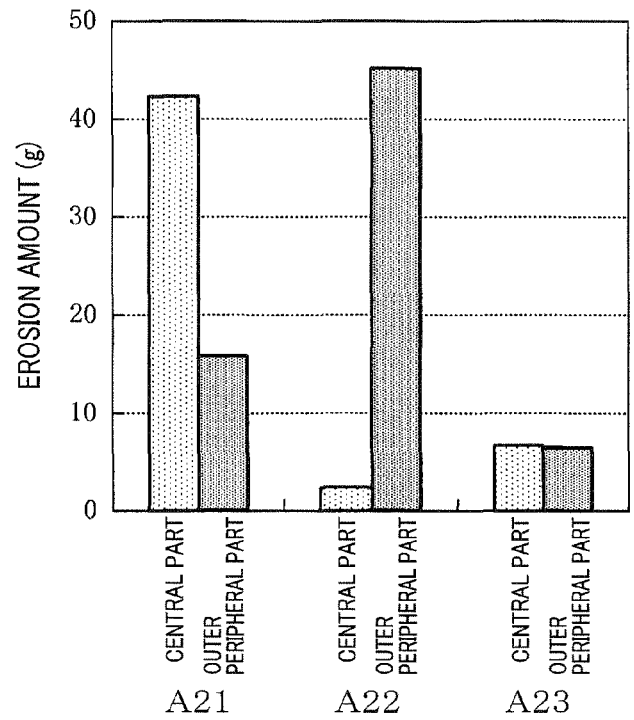
FIG. 22 is a graph showing a comparison result of the erosion amount of each of the comparison samples A21 and A22 and the test sample A23 used in the fourth exemplary embodiment of the present invention.

FIG. 22 is a graph showing a comparison result of an erosion amount of each of the comparison samples A21 and A22 and the test sample A23 used in the fourth exemplary embodiment of the present invention.

As shown in FIG. 22, the test sample A23 according to the present invention has a low erosion amount when compared with that of each of the comparison samples A21 and A22. Further, the test sample A23 has a low influence of the erosion phenomenon (abrasion and damage) by the injection angle when compared with that of each of the comparison samples A21 and A22.

Figure 23:
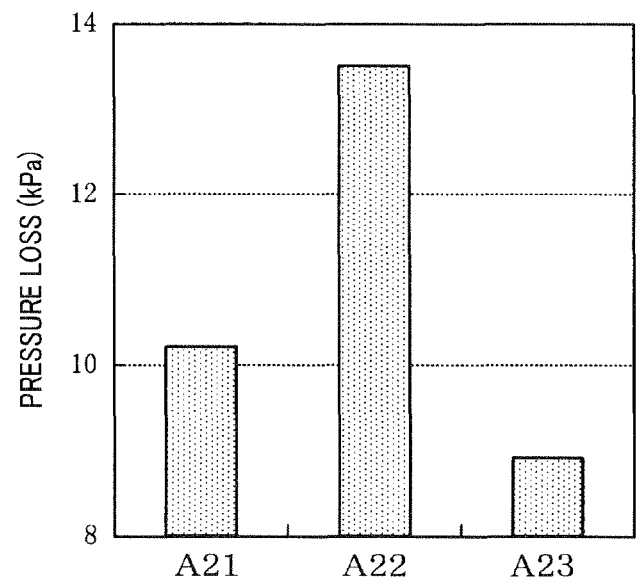
FIG. 23 is a graph showing a comparison result of the pressure loss of the comparison samples A21 and A22 and the test sample A23 used in the fourth exemplary embodiment of the present invention.

FIG. 23 is a graph showing the comparison result of the pressure loss (kPa) of the comparison samples A21 and A22 and the test sample A23 used in the fourth exemplary embodiment of the present invention.

As clearly shown in FIG. 23, the test sample A23 according to the present invention has a low pressure loss when compared with that of each of the comparison sample A21 and A22.

Accordingly, it is possible for the honeycomb structure 1-3 (as the test sample A23) according to the present invention to have a superior anti-erosion capability and to have the function to suppress the pressure loss from being decreased because of having the strength reinforcement sides as the strength reinforcement partition walls formed in the entire radial cross section of the honeycomb structure.

Fifth Exemplary Embodiment

A description will be given of a fifth exemplary embodiment of the present invention with reference to FIG. 24A, FIG. 24B, FIG. 24C, FIG. 26, and FIG. 27. The fifth exemplary embodiment executes the evaluation of the pressure loss and the function to purify exhaust gas.

Figure 24A:
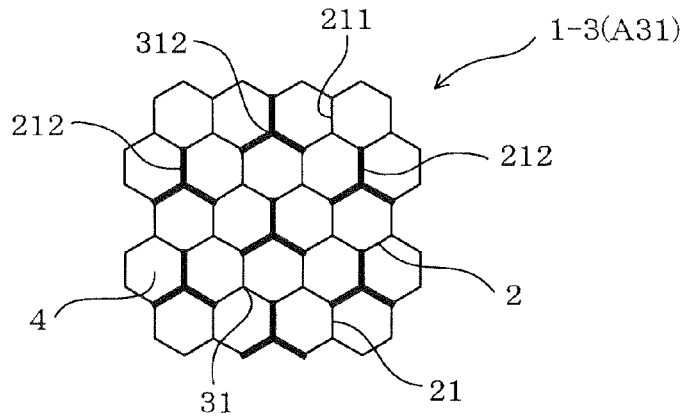
FIG. 24A, FIG. 24B and FIG. 24C are views showing a radial cross section of each of a test sample A31 and comparison samples A32 and A33 used in a fifth exemplary embodiment of the present invention.
Figure 24B:
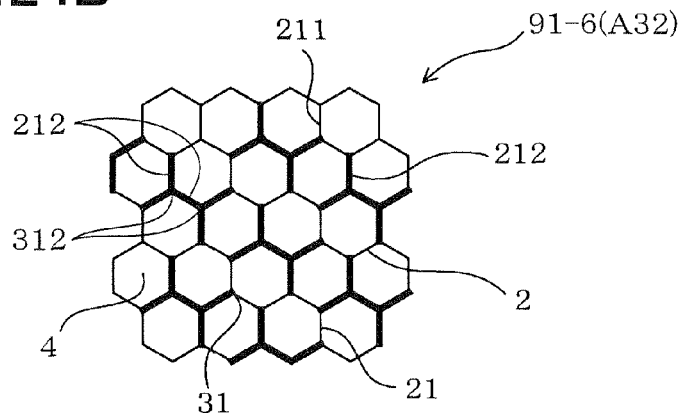
Figure 24C:
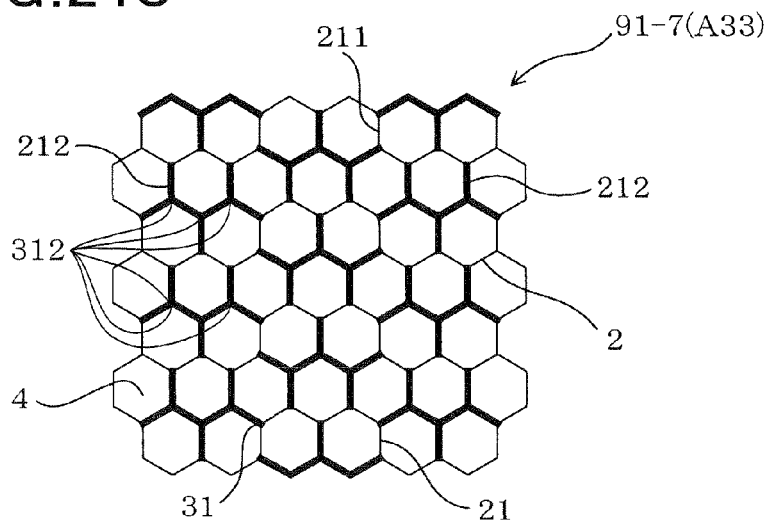

FIG. 24A, FIG. 24A and FIG. 24C are views showing a radial cross section of each of a test sample A31 and comparison samples A32 and A33 used in a fifth exemplary embodiment of the present invention.

The fifth exemplary embodiment prepared and used the test samples A31 and A32 and the comparison sample A33.

As shown in FIG. 24A, the test sample A31 is the honeycomb structure 1-3 having the structure in which three sides 212 of the partition walls (which are joined at the corresponding strength reinforcement intersection point 312 of the three partition walls) are the strength reinforcement sides 212 (designated by the solid lines) of the three strength reinforcement partition walls (which have the same structure shown in FIG. 2). In particular, the two intersection points 132 of the strength reinforcement partition walls are not joined through the strength reinforcement side 212 of the strength reinforcement partition wall. That is, the strength reinforcement intersection point 132 of the strength reinforcement partition walls are separated and are not formed continuously in the cell pattern on a radial cross section.

As shown in FIG. 24B, the comparison sample A32 is a honeycomb structure 91-6 having a structure in which the strength reinforcement sides 212 of the strength reinforcement partition walls (designated by the solid lines) are formed on the radial cross section of the comparison sample A32. In particular, two intersection points 132 of the strength reinforcement partition walls are joined through the side 212 of the strength reinforcement partition wall.

As shown in FIG. 24C, the comparison sample A33 is a honeycomb structure 91-7 having a structure in which the sides 212 of the strength reinforcement partition walls (designated by the solid lines) are formed on the radial cross section of the comparison sample A32. In particular, two intersection points 132 of the strength reinforcement partition walls are joined to each other through the side 212 of the strength reinforcement partition wall.

The fifth exemplary method used the same method of the second exemplary embodiment, as previously described, which evaluates the pressure loss of each sample. That is, the fifth exemplary method used the evaluation condition of air flow rate of 7000 L/minute. Air flow of 7000 L/minute was supplied to each of the test samples A31 and A32 the comparison sample A33. A difference in pressure at the inlet and at the outlet of each of the test samples A31 and A32 and the comparison sample A33 was detected. The pressure difference corresponds to the pressure loss of each sample.

The test samples A31 and A32 and the comparison sample A33 used in the evaluation of the pressure loss had the basic structure shown in FIG. 1 other than the structure previously explained.

Each of the test sample A31 and A32 and the comparison sample A33 used in the evaluation of the pressure loss had an outer diameter of 103 mm, a length of 110 mm, a thickness of each side of a basic partition wall of 68 μm, a thickness of each side of the strength reinforcement partition wall of 88

μm, a cell density of 600 cpsi, a porosity of 30%, an average pore diameter of 5.5 μm, and a supported catalyst amount of 200 g/L.

The fifth exemplary embodiment used the same method of the second exemplary embodiment, as previously described, which evaluates the exhaust gas purifying capability of each sample. That is, the evaluation of the exhaust gas purifying capability used the following conditions:

Drive mode: LA#4 mode; and

THC emission (g/mile) in BAG1.

The test samples A31 and A32 and the comparison sample A33 used in the evaluation of the exhaust gas purifying capability had the basic structure shown in FIG. 1 other than the structure previously explained.

Each of the test samples A31 and A32 and the comparison sample A33 used in the evaluation of the exhaust gas purifying capability had an outer diameter of 103 mm, a length of 110 mm, a thickness of each side of a basic partition wall of 68 μm, a thickness of each strength reinforcement side as the strength reinforcement partition wall of 88 μm, a cell density of 750 cpsi, a porosity of 30%, an average pore diameter of 5.5 μm, and a supported catalyst amount of 200 g/L (Pt: 1 g/L, and Rh: 3 g/L).

Next, a description will now be given of the evaluation results of the characteristics of each sample regarding the pressure loss and the exhaust gas purifying capability.

Figure 25:
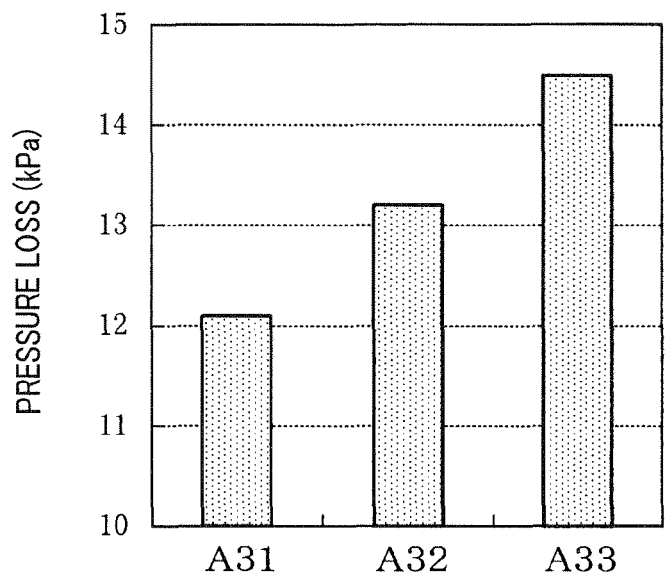
FIG. 25 is a graph showing a comparison result of the pressure loss of the test samples A31 and A32 and the comparison sample A33 used in the fifth exemplary embodiment of the present invention.

FIG. 25 is a graph showing a comparison result of the pressure loss of the test samples A31 and A32 and the comparison sample A33 used in the fifth exemplary embodiment of the present invention.

As clearly understood from the evaluation result shown in FIG. 25, the test sample A31 according to the present invention has a low pressure loss when compared with that of each of the comparison samples A32 and A33.

Figure 26:
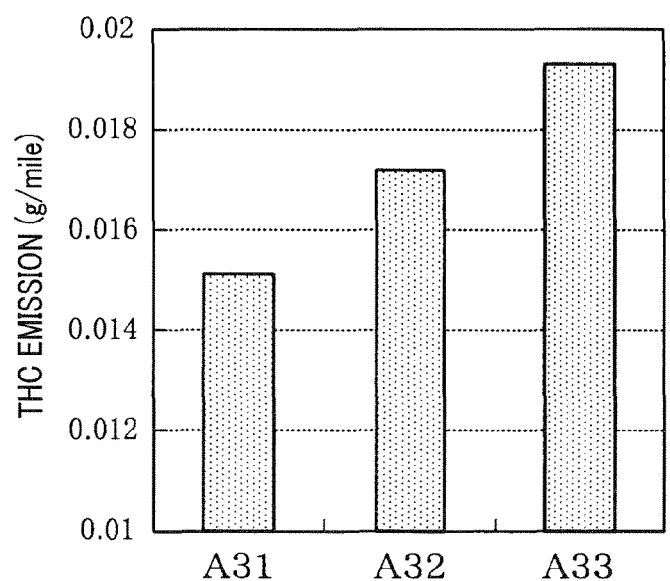
FIG. 26 is a graph showing a comparison result of the THC (Total Hydro Carbon) emission of the test samples A31 and A32 and the comparison sample A33 used in the fifth exemplary embodiment of the present invention.

FIG. 26 is a graph showing a comparison result of the THC emission (g/mile) of the test samples A31 and A32 and the comparison sample A33 used in the fifth exemplary embodiment of the present invention.

As clearly understood from the evaluation result shown in FIG. 26, the test sample A31 according to the present invention has a THC emission (g/mile) which is slightly lower than that of each of the comparison samples A32 and A33.

Accordingly, it is possible for the honeycomb structure 1 (as the test sample A31) according to the present invention to have the function to suppress the pressure loss and the exhaust gas purifying capability from being decreased because of having the improved and novel structure in which the three strength reinforcement sides as the strength reinforcement partition walls are joined to each other at the corresponding intersection point.

Six Exemplary Embodiment

A description will be given of a sixth exemplary embodiment of the present invention with reference to FIG. 27A, FIG. 27B, FIG. 27C, FIG. 28, and FIG. 29. The sixth exemplary embodiment executes the evaluation of anti-erosion capability and the pressure loss as the characteristics of the honeycomb structure.

Figure 27A:
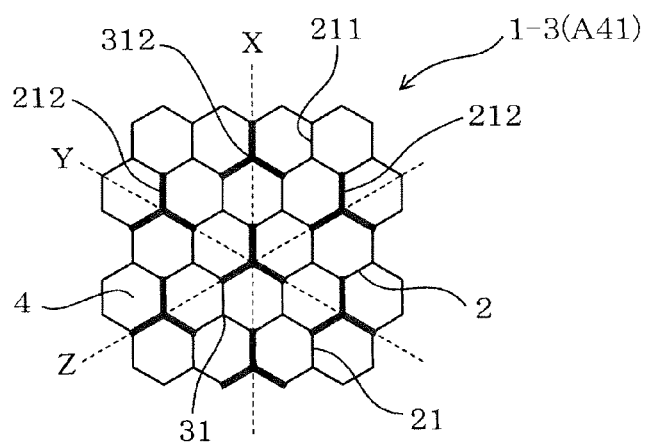
FIG. 27A, FIG. 27B and FIG. 27C are views showing a cross section of each of test samples A41 and A42 and a comparison sample A43 used in a sixth exemplary embodiment of the present invention.
Figure 27B:
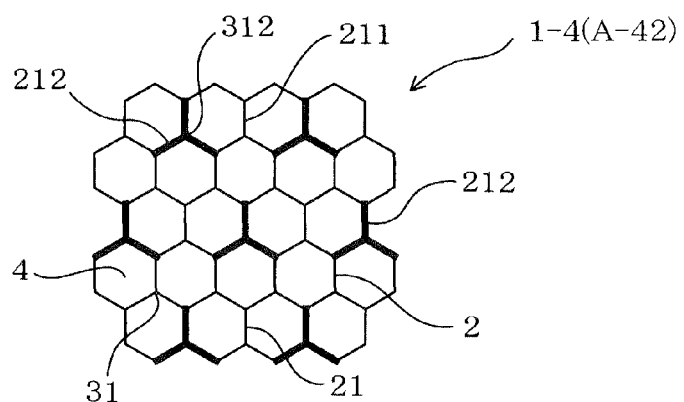
Figure 27C:
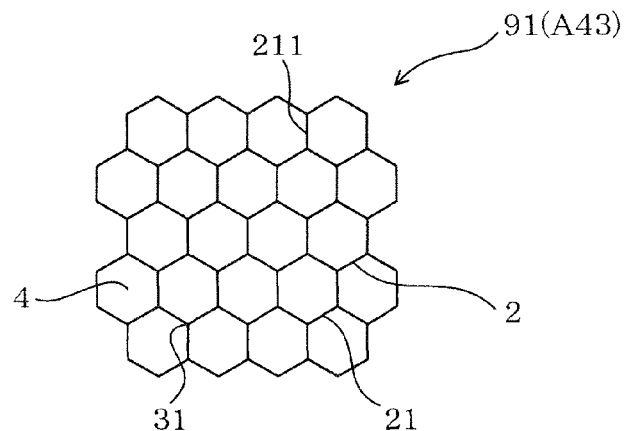

FIG. 27A, FIG. 27B and FIG. 27C are views showing a cross section of each of test samples A41 and A42 and a comparison sample A43 used in a sixth exemplary embodiment of the present invention. The sixth exemplary embodiment prepared and used the test samples A41 and A42 and the comparison sample A43.

As shown in FIG. 27A, the test sample A41 is the honeycomb structure 1-3 having the structure in which three strength reinforcement sides 212 as the partition walls, which are joined at the corresponding intersection point 312 of the three partition walls, are the strength reinforcement sides 212 (designated by the solid lines) of the three strength reinforcement partition walls (which have the same structure shown in FIG. 2). In particular, the strength reinforcement sides 212 as the strength reinforcement partition walls are not formed in line in the directions X, Y and Z.

As shown in FIG. 27B, the test sample A42 is a honeycomb structure 1-4 having the structure in which three strength reinforcement sides 212 as the partition walls, which are joined at the corresponding intersection point 312 of the three partition walls, are the sides 212 (designated by the solid lines) of the three strength reinforcement partition walls. In particular, the strength reinforcement sides 212 as the strength reinforcement partition walls are not formed in line in the directions X, Y and Z.

As shown in FIG. 27C, the comparison sample A43 is a honeycomb structure 91 without any side 212 and intersection point 312 of the strength reinforcement partition walls.

The sixth exemplary embodiment used the same method of the second exemplary embodiment, as previously described, which evaluates the anti-erosion capability of each sample. That is, the sixth exemplary embodiment executed the evaluation of the anti-erosion capability under the following evaluation conditions:

Injection pressure of 1.0 kgf/cm$^2$;

Injection period of 30 seconds;

Fused silica having an average particle size of 120 μm; and

Injection direction of 90° (see FIG. 19A).

The test samples A41 and A42 and the comparison sample A43 used in the evaluation of the anti-erosion capability had the basic structure shown in FIG. 1 other than the structure previously explained.

Each of the test samples A41 and A42 and the comparison sample A43 used in the evaluation of the anti-erosion capability had an outer diameter of 103 mm, a length of 105 mm, a thickness of each side of a basic partition wall of 65 μm, a thickness of each side of the strength reinforcement partition wall of 95 μm, a cell density of 600 cpsi, a porosity of 25%, and an average pore diameter of 5.2 μm. None of the test samples A41 and A42 and the comparison sample A43 supported any catalyst.

The sixth exemplary method used the same method of the second exemplary embodiment, as previously described, which evaluates the pressure loss of each sample. That is, the sixth exemplary method used the evaluation condition of air flow rate of 7000 L/minute. Air flow of 7000 L/minute was supplied to each of the test samples A41 and A42 and the comparison sample 43. A difference in pressure at the inlet and at the outlet of each of the test samples A41 and A42 and the comparison sample A43 was detected. The pressure difference corresponds to the pressure loss of each sample.

The test samples A41 and A42 and the comparison sample A43 used in the evaluation of the pressure loss had the basic structure shown in FIG. 1 other than the structure previously explained.

Each of the test samples A41 and A42 and the comparison sample A43 used in the evaluation of the pressure loss had an outer diameter of 103 mm, a length of 105 mm, a thickness of each side of a basic partition wall of 65 μm, a thickness of each side of the strength reinforcement partition wall of 95 μm, a cell density of 600 cpsi, a porosity of 25%, an average pore diameter of 2.5 μm, and a supported catalyst amount of 250 g/L.

Next, a description will now be given of the evaluation results of the characteristics of each sample regarding the anti-erosion capability and the pressure loss.

Figure 28:
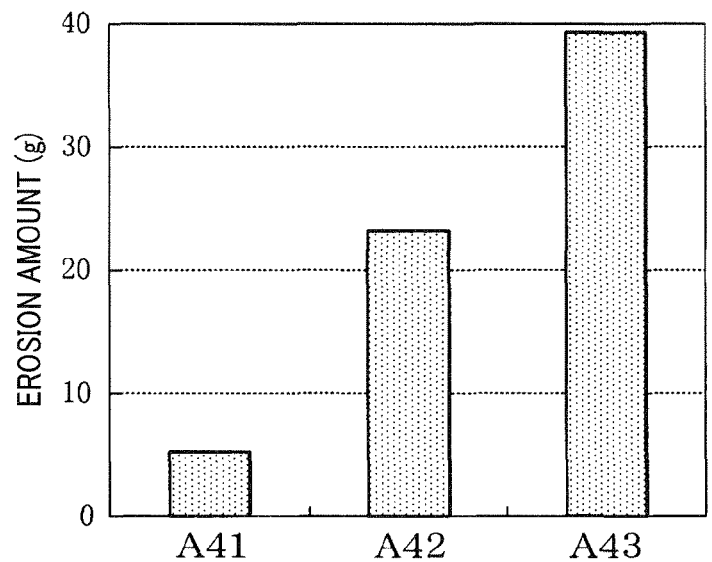
FIG. 28 is a graph showing a comparison result of the erosion amount of each of the test samples A41 and A42 and the comparison sample A43 used in the sixth embodiment of the present invention.

FIG. 28 is a graph showing a comparison result of the erosion amount of each of the test samples A41 and A42 and the comparison sample A43 used in the sixth embodiment of the present invention.

As shown in FIG. 28, the test samples A41 and A42 according to the present invention have a low erosion amount when compared with that of the comparison sample A43. In particular, the test sample A41 has an extremely low erosion amount in the three samples A41, A42 and A43.

Figure 29:
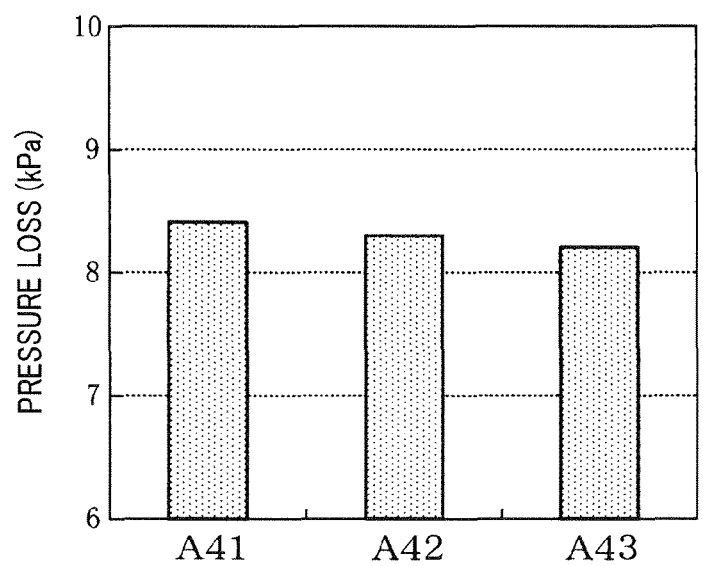
FIG. 29 is a graph showing a comparison result of the pressure loss of the test samples A41 and A42 and the comparison sample A43 used in the sixth exemplary embodiment of the present invention.

FIG. 29 is a graph showing a comparison result of the pressure loss (kPa) of the test samples A41 and A42 and the comparison sample A43 used in the sixth exemplary embodiment of the present invention.

As clearly shown in FIG. 29, the test samples A41 and A42 according to the present invention approximately has the same pressure loss of the comparison example A43.

Accordingly, it is possible for the honeycomb structure according to the present invention (as the test samples A41 and A42) to have a superior anti-erosion capability and to have the function to suppress the pressure loss from being decreased. It can be understood that it is preferable to form the strength reinforcement sides as the strength reinforcement partition walls in the three directions X, Y and Z shown in FIG. 27A.

Seventh Embodiment

A description will be given of a seventh exemplary embodiment of the present invention with reference to FIG. 30A, FIG. 30B, FIG. 30C, FIG. 31, and FIG. 32. The seventh exemplary embodiment executes the evaluation of the anti-erosion capability and the pressure loss as the characteristics of the honeycomb structure.

Figure 30A:
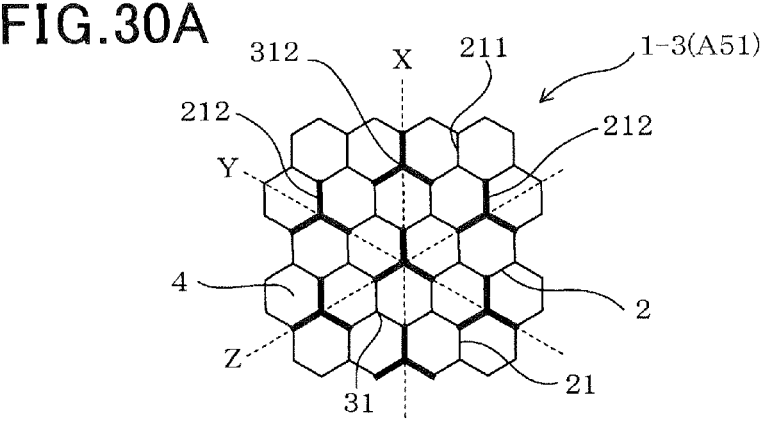
FIG. 30A, FIG. 30B and FIG. 30C are views showing a cross section of each of test samples A51, A52 and A53 used in a seventh exemplary embodiment of the present invention.
Figure 30B:
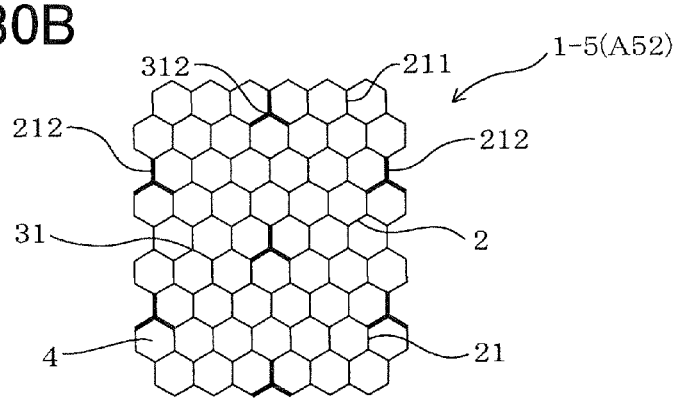
Figure 30C:
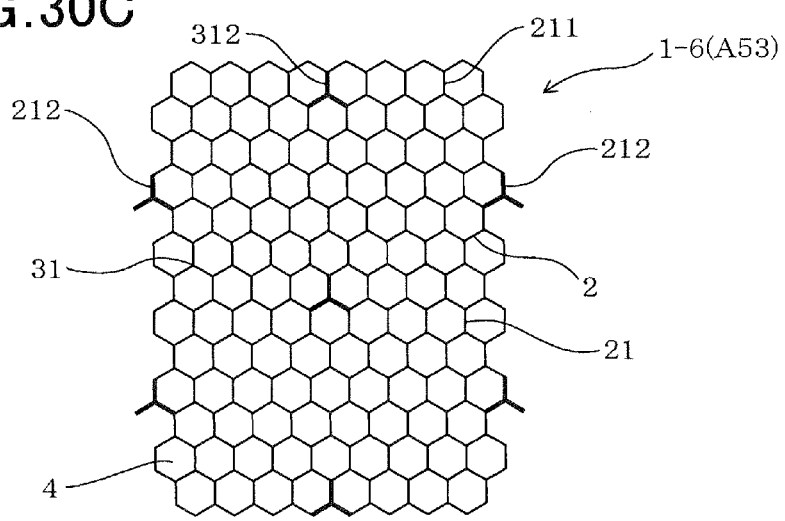

FIG. 30A, FIG. 30B and FIG. 30C are views showing a cross section of each of test samples A51, A52 and A53 used in a seventh exemplary embodiment of the present invention. The seventh exemplary embodiment prepared and used the test samples A51, A52 and A53.

As shown in FIG. 30A, the test sample A51 is the honeycomb structure 1-3 having the structure in which the strength reinforcement intersection point 312 of the strength reinforcement partition walls, at which three strength reinforcement sides 212 (designated by the solid lines) of the three strength reinforcement partition walls are joined to each other, is arranged alternately on the intersection points in each of the directions X, Y and Z.

As shown in FIG. 30B, the test sample A52 is a honeycomb structure 1-5 having the structure in which the strength reinforcement intersection point 312 of the strength reinforcement partition walls, at which three strength reinforcement sides 212 (designated by the solid lines) of the three strength reinforcement partition walls are joined to each other, is arranged every fourth on the intersection points in each of the directions X, Y and Z.

As shown in FIG. 30C, the test sample A53 is a honeycomb structure 1-6 having the structure in which the strength reinforcement intersection point 312 of the strength reinforcement sides 212 (designated by the solid lines) of the three strength reinforcement partition walls are joined to each other, is arranged every fifth on the intersection points formed on a radial cross section in each of the directions X, Y and Z.

The seventh exemplary embodiment used the same method of the second exemplary embodiment, as previously described, which evaluates the anti-erosion capability of each sample. That is, the seventh exemplary embodiment executed the evaluation of the anti-erosion capability under the following evaluation conditions:

Injection pressure of 1.0 kgf/cm$^2$;
Injection period of 30 seconds;
Fused silica having an average particle size of 120 μm; and
Injection direction of 90° (see FIG. 19A).

The test samples A51, A52 and A53 used in the evaluation of the anti-erosion capability had the basic structure shown in FIG. 1 other than the structure previously explained.

Each of the test samples A51, A52 and A53 used in the evaluation of the anti-erosion capability had an outer diameter of 103 mm, a length of 105 mm, a thickness of each side of a basic partition wall of 94 μm, a thickness of each strength reinforcement side as the strength reinforcement partition wall of 120 μm, a cell density of 600 cpsi, a porosity of 35%, and an average pore diameter of 8.2 μm. None of the test samples A51, A52 and A53 supported any catalyst.

The seventh exemplary method used the same method of the second exemplary embodiment, as previously described, which evaluates the pressure loss of each sample. That is, the seventh exemplary method used the evaluation condition of air flow rate of 7000 L/minute. Air flow of 7000 L/minute was supplied to each of the test samples A51, A52 and A53. A difference in pressure at the inlet of and the outlet of each of the test samples A51, A52 and A53 was detected. The pressure difference corresponds to the pressure loss of each sample.

The test samples A51, A52 and A53 used in the evaluation of the pressure loss had the basic structure shown in FIG. 1 other than the structure previously explained.

Each of the test samples A51, A52 and A53 used in the evaluation of the pressure loss had an outer diameter of 103 mm, a length of 105 mm, a thickness of each side of a basic partition wall of 92 μm, a thickness of each strength reinforcement side as the strength reinforcement partition wall of 120 μm, a cell density of 600 cpsi, a porosity of 35%, an average pore diameter of 8.2 μm, and a supported catalyst amount of 270 g/L.

Next, a description will now be given of the evaluation results of the characteristics of each sample regarding the anti-erosion capability and the pressure loss.

Figure 31:
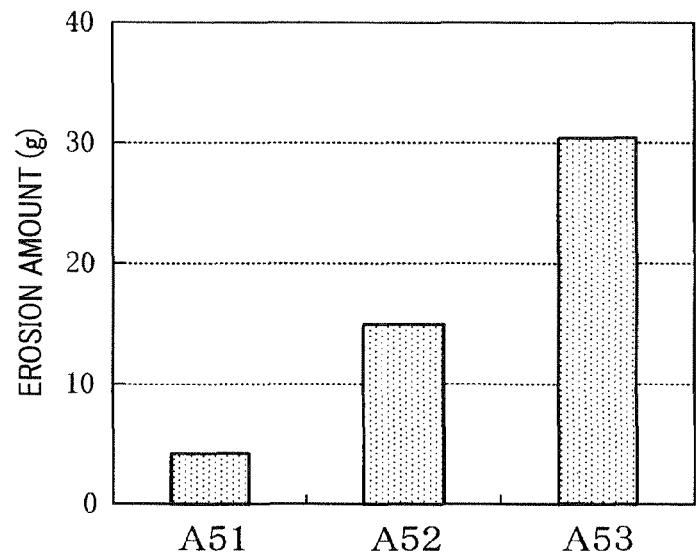
FIG. 31 is a graph showing a comparison result of the erosion amount of each of the test samples A51, A52 and A53 used in the seventh embodiment of the present invention.

FIG. 31 is a graph showing a comparison result of erosion amount of each of the test samples A51, A52 and A53 used in the seventh embodiment of the present invention. As shown in FIG. 31, the test sample A51 according to the present invention has a low erosion amount when compared with that of each of the test samples A52 and A53 according to the present invention. Further, the test sample A23 has a low influence of the erosion phenomenon (abrasion and damage) by the injection angle when compared with that of each of the comparison samples A21 and A22.

Figure 32:
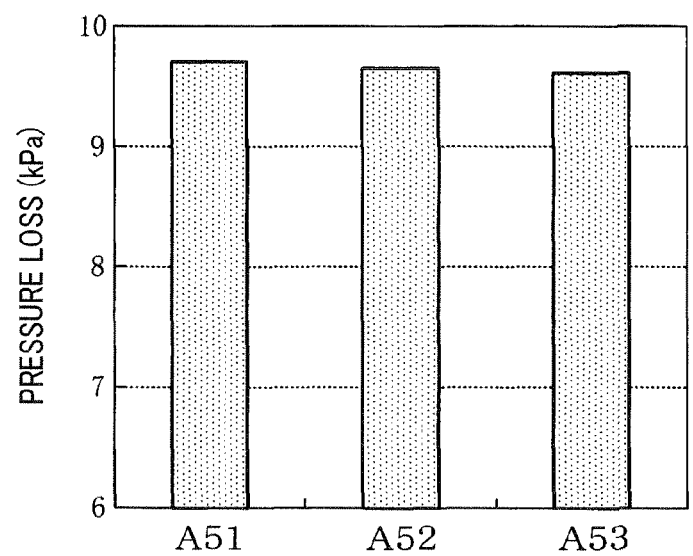
FIG. 32 is a graph showing a comparison result of the pressure loss of the test samples A51, A52 and A53 used in the seventh exemplary embodiment of the present invention.

FIG. 32 is a graph showing a comparison result of the pressure loss of the test samples A51, A52 and A53 used in the seventh exemplary embodiment of the present invention;

As clearly shown in FIG. 32, all of the test samples A51, A52 and A53 according to the present invention have a low pressure loss.

Accordingly, it is possible for the honeycomb structure according to the present invention (as the test samples A51, A52 and A53) to have a superior anti-erosion capability and to have the function to suppress the pressure loss from being decreased. It can be understood that it is preferable to form the strength reinforcement intersection points alternately present on the intersection points, namely, alternately formed on a radial cross section in the three directions X, Y and Z shown in FIG. 30A.

Eighth Exemplary Embodiment

A description will be given of an eighth exemplary embodiment of the present invention with reference to FIG. 33. The eighth exemplary embodiment executes the evaluation of the anti-erosion capability and the pressure loss as the characteristics of the honeycomb structure.

The eighth exemplary embodiment prepared and used test samples having the structure in which a gap d (shown in FIG. 3, for example) between sides which face to each other in a hexagonal arrangement pattern (which will also be referred to as the "facing sides") obtained by connecting the strength reinforcement intersection points is within a range of 10 to 80 mm.

The eighth exemplary embodiment used the same method of the second exemplary embodiment, as previously described, which evaluates the anti-erosion capability of each sample. That is, the eighth exemplary embodiment executed the evaluation of the anti-erosion capability under the following evaluation conditions:

Injection pressure of 1.0 kgf/cm$^2$;
Injection period of 30 seconds;
Fused silica having an average particle size of 120 µm; and
Injection direction of 90° (see FIG. 19A).

The test samples used in the evaluation of the anti-erosion capability had the basic structure shown in FIG. 1 other than the structure previously explained.

Each of the test samples used in the evaluation of the anti-erosion capability had an outer diameter of 103 mm, a length of 105 mm, a thickness of each side of a basic partition wall of 68 µm, a thickness of each strength reinforcement side as the strength reinforcement partition wall of 100 µm, a cell density of 750 cpsi, a porosity of 30%, and an average pore diameter of 6.3 µm. None of the test samples supported any catalyst.

The eighth exemplary method used the same method of the second exemplary embodiment, as previously described, which evaluates the pressure loss of each sample. That is, the eighth exemplary method used the evaluation condition of air flow rate of 7000 L/minute. Air flow of 7000 L/minute was supplied to each of the test samples. A difference in pressure at the inlet and at the outlet of each of the test samples was detected. The pressure difference corresponds to the pressure loss of each sample.

The test samples used in the evaluation of the pressure loss had the basic structure shown in FIG. 1 other than the structure previously explained.

Each of the test samples used in the evaluation of the pressure loss had an outer diameter of 103 mm, a length of 105 mm, a thickness of each side of a basic partition wall of 68 µm, a thickness of each strength reinforcement side as the strength reinforcement partition wall of 100 µm, a cell density of 750 cpsi, a porosity of 30%, an average pore diameter of 6.3 µm, and a supported catalyst amount of 250 g/L.

Next, a description will now be given of the evaluation results of the characteristics of each sample having a different gap d (mm) regarding the anti-erosion capability and the pressure loss.

Figure 33:
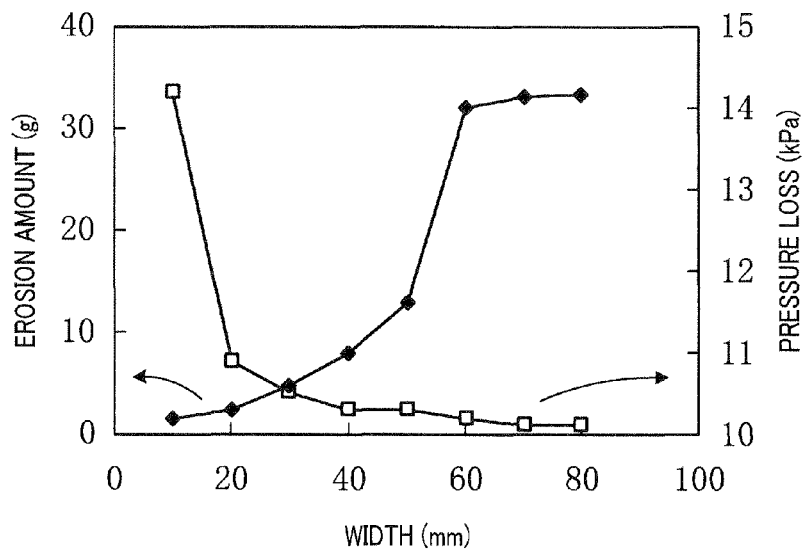
FIG. 33 is a graph showing a relationship between a gap d, an erosion amount, and a pressure loss of test samples used in an eighth exemplary embodiment of the present invention.

FIG. 33 is a graph showing a relationship between the gap d, the erosion amount and the pressure loss of test samples used in the eighth exemplary embodiment of the present invention.

As can be understood from the evaluation result shown in FIG. 33, the cells are clogged with catalyst when the gap between the facing sides of the strength reinforcement partition walls is less than 20 mm, and the pressure loss is thereby speedily increased. On the other hand, when the gap between the facing sides exceeds 50 mm, it is difficult to obtain the required entire-strength of the honeycomb structure and the required anti-erosion capability. That is, when the gap between the facing sides of the strength reinforcement partition walls exceeds 50 mm, this structure introduces an exponential increase of the erosion amount of the honeycomb structure.

It is required for the honeycomb structure to have the improved structure in which the gap between the facing sides of the strength reinforcement partition walls is within a range of 20 to 50 mm in order to obtain both the functions to increase the anti-erosion capability and decreasing the pressure loss.

Ninth Exemplary Embodiment

A description will be given of a ninth exemplary embodiment of the present invention with reference to FIG. 33. The ninth exemplary embodiment executes the evaluation of the anti-erosion capability and the pressure loss as the characteristics of the honeycomb structure.

The ninth exemplary embodiment prepared and used a plurality of test samples having a thickness of each of the strength reinforcement sides as the strength reinforcement partition walls within a range of 68 to 122 µm.

The ninth exemplary embodiment used the same method of the second exemplary embodiment, as previously described, which evaluates the anti-erosion capability of each sample. That is, the ninth exemplary embodiment executed the evaluation of the anti-erosion capability under the following evaluation conditions:

Injection pressure of 1.0 kgf/cm$^2$;
Injection period of 30 seconds;
Fused silica having an average particle size of 120 µm; and
Injection direction of 90° (see FIG. 19A).

The test samples used in the evaluation of the anti-erosion capability had the basic structure shown in FIG. 1 other than the structure previously explained.

Each of the samples used in the evaluation of the anti-erosion capability had an outer diameter of 103 mm, a length of 105 mm, a thickness of each side of a basic partition wall of 68 µm, a cell density of 750 cpsi, a porosity of 30%, and an average pore diameter of 6.3 µm. None of the samples supported any catalyst.

The ninth exemplary method used the same method of the second exemplary embodiment, as previously described, which evaluates the pressure loss of each sample. That is, the ninth exemplary method used the evaluation condition of air flow rate of 7000 L/minute. Air flow of 7000 L/minute was supplied to each of the samples. A difference in pressure at the inlet of and the outlet of each of the sample was detected. The pressure difference corresponds to the pressure loss of each sample.

The samples used in the evaluation of the pressure loss had the basic structure shown in FIG. 1 other than the structure previously explained.

Each of the samples used in the evaluation of the pressure loss had an outer diameter of 103 mm, a length of 105 mm, a thickness of each side of a basic partition wall of 68 µm, a cell density of 750 cpsi, a porosity of 30%, an average pore diameter of 6.3 µm, and a supported catalyst amount of 250 g/L.

Next, a description will now be given of the evaluation results of the characteristics of each sample regarding the anti-erosion capability and the pressure loss.

Figure 34:
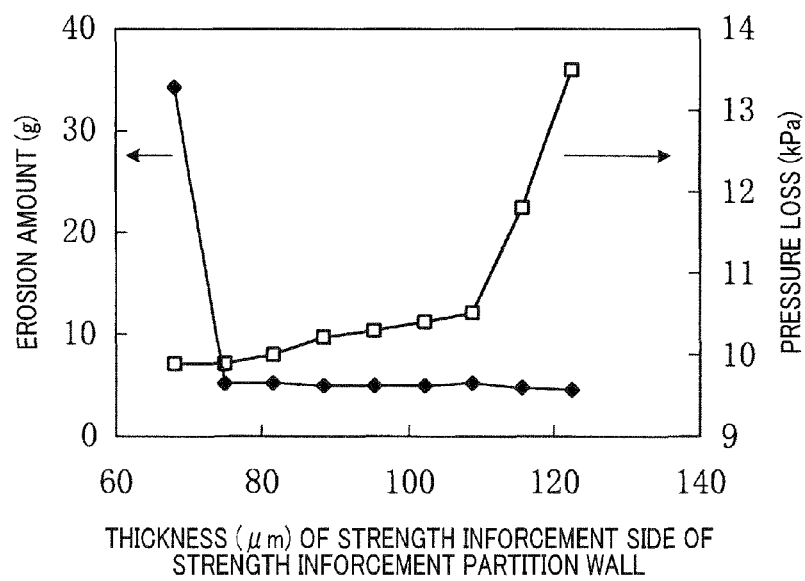
FIG. 34 is a graph showing a relationship between a thickness of strength reinforcement part, the erosion amount and the pressure loss of test samples used in a ninth exemplary embodiment of the present invention.

FIG. 34 is a graph showing a relationship between the thickness of strength reinforcement part, the erosion amount and the pressure loss of the samples used in the ninth exemplary embodiment of the present invention.

As can be understood from the relationship shown in FIG. 34, when the thickness of each of the strength reinforcement sides as the strength reinforcement partition walls is less than 75 mm (which is 1.1 times of the thickness of the side of the basic partition wall), this structure causes the explosion increase of the erosion amount because of being difficult to obtain the required anti-erosion capability and the required strength of the honeycomb structure.

On the other hand, when the thickness of each of the strength reinforcement sides as the strength reinforcement partition walls exceeds 110 mm (which is 1.6 times of the thickness of the side of the basic partition wall), this structure causes explosion increase of the pressure loss because of generating clogged cells with catalyst.

Accordingly, in order to increase the anti-erosion capability and to suppress the pressure loss from being decreased, it is required for the honeycomb structure of the present invention to have the structure in which the strength reinforcement sides as the strength reinforcement partition walls has a thickness which is 1.1 times to 1.6 times of the thickness of a side of the basic partition wall.

Tenth Exemplary Embodiment

A description will be given of a tenth exemplary embodiment of the present invention with reference to FIG. 35 to FIG. 38. The tenth exemplary embodiment executes the evaluation of the anti-erosion capability and the pressure loss as the characteristics of the honeycomb structure.

Figure 35:
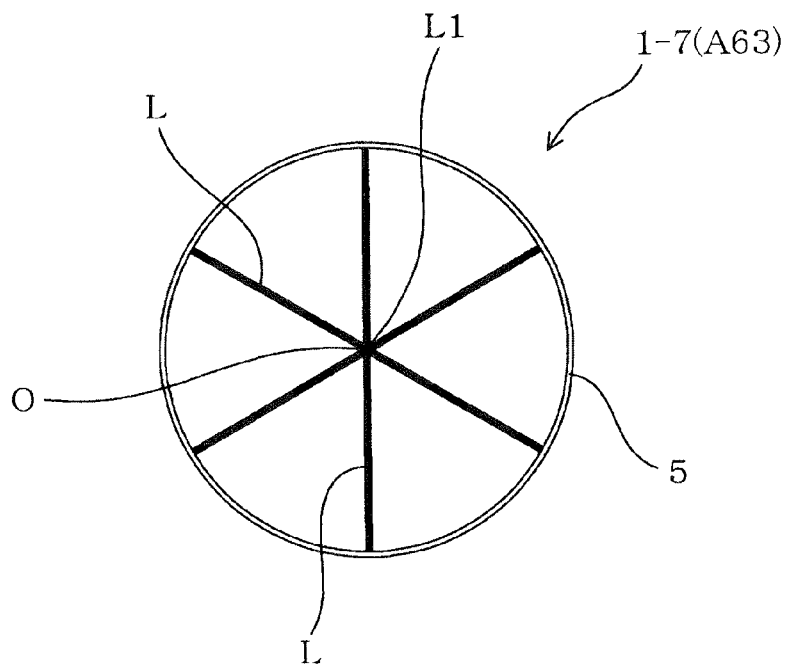
FIG. 35 is a view showing a radial cross section of a test sample A63 used in a tenth exemplary embodiment of the present invention.
Figure 36:
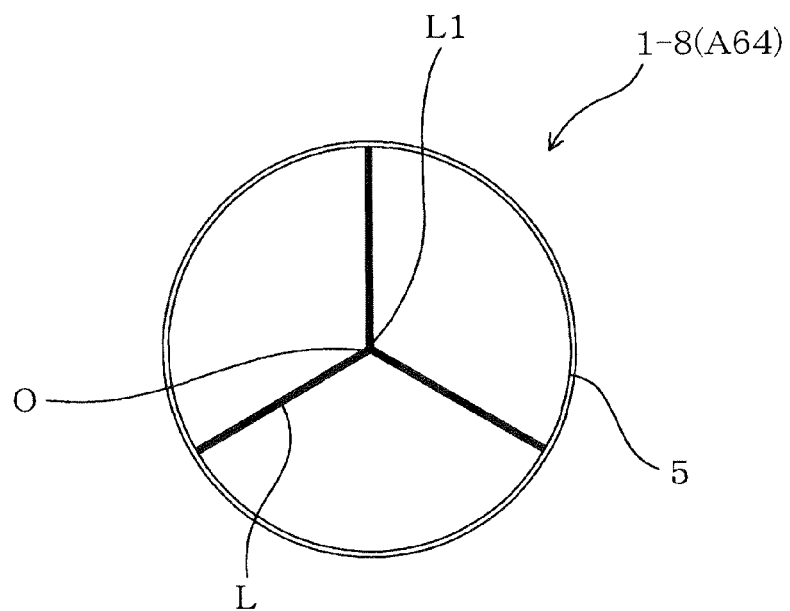
FIG. 36 is a view showing a radial cross section of a test sample A64 used in the tenth exemplary embodiment of the present invention.
Figure 37:
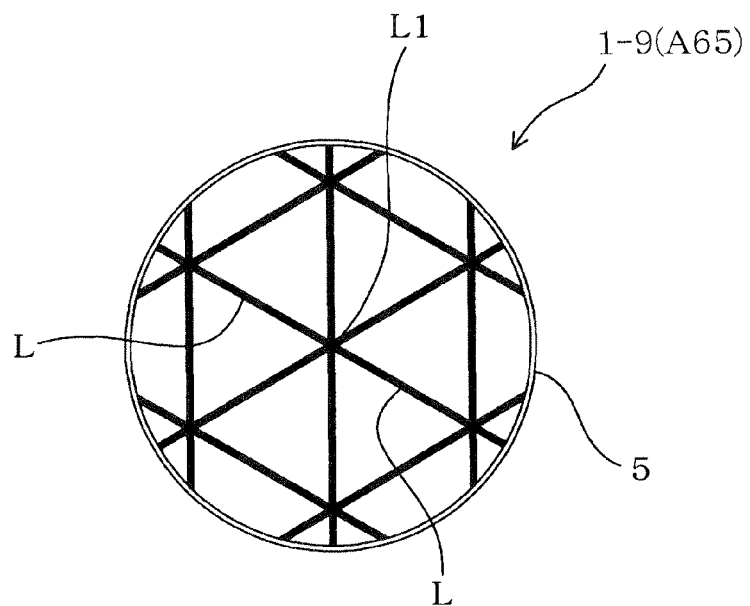
FIG. 37 is a view showing a radial cross section of a test sample A65 used in the tenth exemplary embodiment of the present invention.
Figure 38:
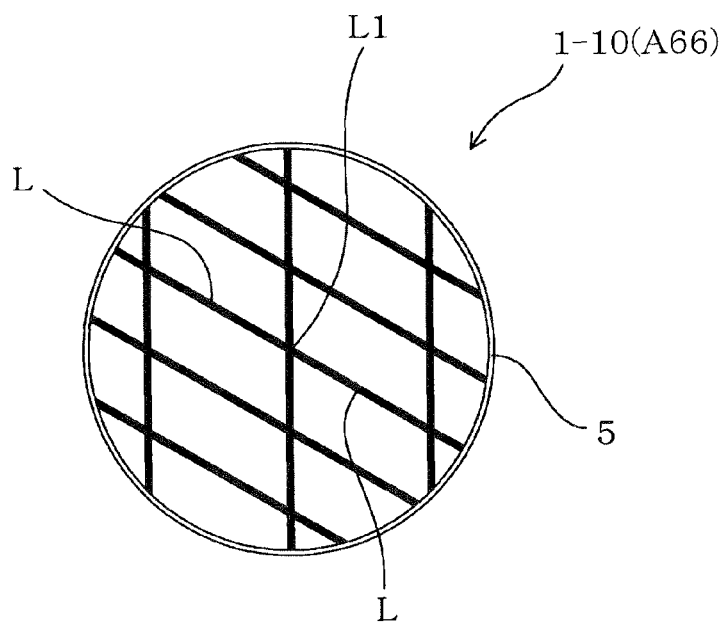
FIG. 38 is a view showing a radial cross section of a test sample A66 used in the tenth exemplary embodiment of the present invention.

FIG. 35 to FIG. 38 are views showing a radial cross section of each of test samples A63 to A66 used in the tenth exemplary embodiment of the present invention. The tenth exemplary embodiments prepared and used six samples (as the honeycomb structures) composed of a comparison sample A61 and five test samples A62 to A66 having a different structure as shown in FIG. 35 and FIG. 38.

The comparison sample A61 has the same structure of the conventional honeycomb structure 91 shown in FIG. 13

The test sample A62 has the same structure of the honeycomb structure 1 according to the present invention shown in FIG. 3 in which three connection lines L are joined at the corresponding intersection point L1. As previously described, the strength reinforcement intersection points of the strength reinforcement partition walls are arranged at a predetermined regular interval on the connection lines L shown in FIG. 3. The three connection lines L are joined at the corresponding intersection point L1.

As shown in FIG. 35, the test sample A63 is the honeycomb structure 1-7 according to the present invention having the structure in which the six connection lines L are radially arranged every 60° from the central point O of a radial cross section of the test sample A63. That is, the radial cross section of the test sample A63 are divided into the six areas by the six connection lines L. The strength reinforcement intersection points of the strength reinforcement partition walls are arranged at a predetermined regular interval on the six connection lines L. The six connection lines L are joined at the central point O.

As shown in FIG. 36, the test sample A64 is the honeycomb structure 1-8 according to the present invention having the structure in which the three connection lines L are radially arranged every 120° from the central point O of a radial cross section of the test sample A64. That is, the radial cross section of the test sample A64 are divided by the three areas by the three connection lines L. The strength reinforcement intersection points of the strength reinforcement partition walls are arranged at a predetermined regular interval on the connection lines L. The three connection lines L are joined at the central point O.

As shown in FIG. 37, the test sample A65 is the honeycomb structure 1-9 according to the present invention having the structure in which the connection lines L are arranged in order to form a plurality of triangle lattice areas. The strength reinforcement intersection points of the strength reinforcement partition walls are arranged at a predetermined regular interval on the connection lines L. The six connection lines L are joined to each other at the corresponding intersection point L1.

As shown in FIG. 38, the test sample A66 is the honeycomb structure 1-10 according to the present invention having the structure in which the connection lines L are arranged in order to form a plurality of rectangle areas (as a parallelogram shape shown in FIG. 38). The strength reinforcement intersection points of the strength reinforcement partition walls are arranged at a predetermined regular interval on the connection lines L. The four connection lines L are joined at the corresponding intersection point L1.

The tenth exemplary embodiment used the same method of the second exemplary embodiment previously described, which evaluates the anti-erosion capability of each sample.

The tenth exemplary embodiment executed the evaluation under the following evaluation conditions:

Injection position of 150 mm height apart from the end surface of each sample and of 150 mm shifted from the center of the end surface of each sample toward an outside direction in a diameter of each sample;

Injection pressure of 1.0 kgf/cm$^2$;

Injection period of 30 seconds;

Fused silica having an average particle size of 120 μm; and

Injection direction of 90° (see FIG. 19A).

The test samples used in the evaluation of the anti-erosion capability had the basic structure shown in FIG. 1 other than the structure previously explained.

Each of the samples used in the evaluation of the anti-erosion capability had an outer diameter of 103 mm, a length of 105 mm, a thickness of each side of a basic partition wall of 92 μm, a thickness of each strength reinforcement side as the strength reinforcement partition wall of 120 μm, a cell density of 700 cpsi, a porosity of 35%, and an average pore diameter of 8.2 μm. None of the samples supported any catalyst.

The tenth exemplary method used the same method of the second exemplary embodiment, as previously described, which evaluates the pressure loss of each sample. That is, the ninth exemplary method used the evaluation condition of air flow rate of 7000 L/minute. Air flow of 7000 L/minute was supplied to each of the samples. A difference in pressure at the inlet of and at the outlet of each of the sample was detected. The pressure difference corresponds to the pressure loss of each sample.

The samples used in the evaluation of the pressure loss had the basic structure shown in FIG. 1 other than the structure previously explained.

Each of the samples used in the evaluation of the pressure loss had an outer diameter of 103 mm, a length of 105 mm, a thickness of each side of a basic partition wall of 92 μm, a thickness of each strength reinforcement side of the strength reinforcement partition wall of 120 μm, a cell density of 700 cpsi, a porosity of 35%, an average pore diameter of 8.2 μm, and a supported catalyst amount of 250 g/L.

Next, a description will now be given of the evaluation results of the characteristics of each sample regarding the anti-erosion capability and the pressure loss.

Figure 39:
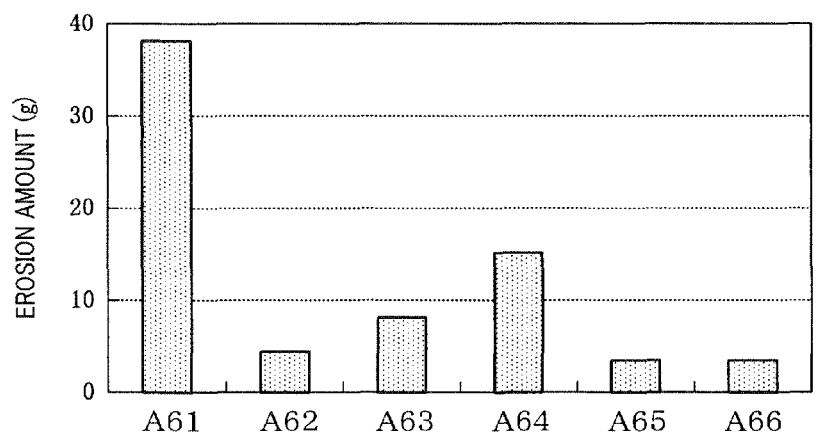
FIG. 39 is a graph showing a comparison result of the erosion amount of each of the test samples and the comparison sample used in tenth embodiment of the present invention.

FIG. 39 is a graph showing a comparison result of the erosion amount of each of the test samples A62 to A66 and the comparison sample A61 used in tenth embodiment of the present invention;

As shown in FIG. 39, the test samples A62 to A66 according to the present invention have a low erosion amount when compared with that of the comparison sample A61. In particular, the test samples A62, A65 and A66 have a very low erosion amount because the connection lines L are arranged in a polygon shape (such as a triangle shape, a rectangle shape, etc.) on a radial cross section.

Figure 40:
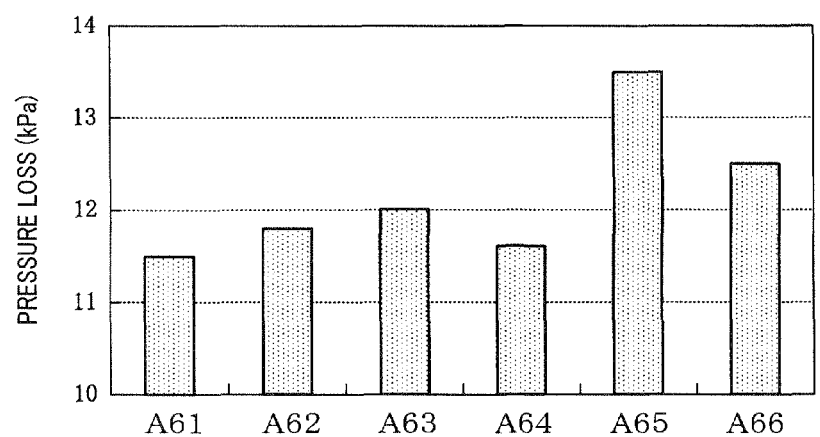
FIG. 40 is a graph showing a comparison result of the pressure loss of the test samples and the comparison samples used in the tenth exemplary embodiment of the present invention.

FIG. 40 is a graph showing a comparison result of the pressure loss of the test samples A62 to A66 and the comparison sample A61 used in the tenth exemplary embodiment of the present invention. As clearly shown in FIG. 40, all of the test samples A62 to A64 according to the present invention have approximately the same pressure loss of the comparison sample A61 having a conventional structure. In particular, the test samples A65 and A66 have a pressure loss which is slightly higher than that of the comparison sample A61 because the test samples A65 and A66 have many connection lines and this decreases the effect of suppressing the decrease of the pressure loss.

Considering the evaluation result of the tenth exemplary embodiment, it is preferable for the honeycomb structure to have the structure (test sample A62) shown in FIG. 3 as previously explained in the first exemplary embodiment because the test sample A62 has a very low erosion amount in all of the samples A61 to A66, and has a small pressure loss which is approximately equal to the comparison sample A61 as shown in FIG. 40.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A honeycomb structure comprising:
a plurality of cells, each of the cells having a hexagonal shape and being surrounded by six partition walls, the partition walls being arranged in a hexagonal lattice pattern on the entirety of a radial cross section of the honeycomb structure; and
a cylindrical outer peripheral wall, with which an outer wall surface of the honeycomb structure is covered,
wherein the partition walls are composed of a plurality of sides and intersection points, six sides forming one cell of a hexagonal shape, and three partition walls are joined to each other at a corresponding intersection point,
the sides of the partition walls are divided into sides of basic partition walls and sides of strength reinforcement partition walls, a thickness of each of the strength reinforcement partition walls being thicker than a thickness of each of the basic partition walls,
at least some of the intersection points are strength reinforcement intersection points, and three strength reinforcement sides as the strength reinforcement partition walls are joined to each other at a corresponding strength reinforcement intersection point,
each of the three strength reinforcement sides, which form one group of three partition walls, are joined at one strength reinforcement intersection point which is not connected continuously to any of the strength reinforcement sides, which form another group of three partition walls, joined at another strength reinforcement intersection point; and
the strength reinforcement intersection points are arranged on the entire surface of the radial cross section of the honeycomb structure, which is perpendicular to the axial direction of the honeycomb structure.

2. The honeycomb structure according to claim 1, wherein the surfaces of the basic partition walls and the strength reinforcement partition walls support a catalyst which is capable of purifying exhaust gas.

3. The honeycomb structure according to claim 1, wherein the strength reinforcement intersection points are alternately arranged in one of three directions in which the partition walls are arranged on the entirety of the radial cross section of the honeycomb structure.

4. The honeycomb structure according to claim 2, wherein the surfaces of the basic partition walls and the strength reinforcement partition walls support a catalyst which is capable of purifying exhaust gas.

5. The honeycomb structure according to claim 2, wherein the strength reinforcement intersection points are arranged on the entire surface of the radial cross section in order to divide the entirety of the radial cross section of the honeycomb structure into a plurality of areas.

6. The honeycomb structure according to claim 5, wherein the strength reinforcement intersection points are arranged in a hexagonal lattice pattern on the entirety of the radial cross section of the honeycomb structure.

7. The honeycomb structure according to claim 6, wherein a gap between facing sides in a hexagonal shape obtained by connecting the strength reinforcement intersection points in the hexagonal lattice pattern is within a range of 20 to 50 mm.

8. The honeycomb structure according to claim 7, wherein a thickness of each of the strength reinforcement sides as the strength reinforcement partition walls has a thickness which is within a range of 1.1 to 1.6 times the thickness of each of the basic partition walls.

9. The honeycomb structure according to claim 1, wherein the strength reinforcement intersection points are arranged on the entire surface of the radial cross section in order to divide the entirety of the radial cross section of the honeycomb structure into a plurality of areas.

10. The honeycomb structure according to claim 9, wherein the surfaces of the basic partition walls and the strength reinforcement partition walls support a catalyst which is capable of purifying exhaust gas.

11. The honeycomb structure according to claim 9, wherein the strength reinforcement intersection points are arranged in a hexagonal lattice pattern on the entirety of the radial cross section of the honeycomb structure.

12. The honeycomb structure according to claim 11, wherein the surfaces of the basic partition walls and the strength reinforcement partition walls support a catalyst which is capable of purifying exhaust gas.

13. The honeycomb structure according to claim 11, wherein a gap between facing sides in a hexagonal shape obtained by connecting the strength reinforcement intersection points in the hexagonal lattice pattern is within a range of 20 to 50 mm.

14. The honeycomb structure according to claim 13, wherein the surfaces of the basic partition walls and the strength reinforcement partition walls support a catalyst which is capable of purifying exhaust gas.

15. The honeycomb structure according to claim 11, wherein a thickness of each of the strength reinforcement sides as the strength reinforcement partition walls has a thickness which is within a range of 1.1 to 1.6 times the thickness of each of the basic partition walls.

16. The honeycomb structure according to claim 15, wherein the surfaces of the basic partition walls and the strength reinforcement partition walls support a catalyst which is capable of purifying exhaust gas.

* * * * *

UNITED STATES PATENT AND TRADEMARK OFFICE
CERTIFICATE OF CORRECTION

PATENT NO. : 8,808,836 B2
APPLICATION NO. : 13/452302
DATED : August 19, 2014
INVENTOR(S) : Hiratsuka It is certified that error appears in the above-identified patent and that said Letters Patent is hereby corrected as shown below:

In the Claims

Beginning at col. 31, line 48, replace claims 1-16 of the issued patent with the following correct claims 1-16.

1. A honeycomb structure comprising:

a plurality of cells, each of the cells having a hexagonal shape and being surrounded by six partition walls, the partition walls being arranged in a hexagonal lattice pattern on the entire of a radial cross section of the honeycomb structure; and a cylindrical outer peripheral wall, with which an outer wall surface of the honeycomb structure is covered, wherein the partition walls are composed of a plurality of sides and intersection points, six sides forming one cell of a hexagonal shape, and three partition walls are joined to each other at a corresponding intersection point, the sides of the partition walls are divided into sides of basic partition walls and strength reinforcement sides of strength reinforcement partition walls, a thickness of each of the strength reinforcement partition walls being thicker than a thickness of each of the basic partition walls, at least some of the intersection points are strength reinforcement intersection points, and three strength reinforcement sides as the strength reinforcement partition walls are joined to each other at a corresponding strength reinforcement intersection point, each of the strength reinforcement sides, which form one group of the three partition walls, are joined at one strength reinforcement intersection point which is not connected continuously to each of the strength reinforcement sides, which form another group of the three partition walls, joined at another strength reinforcement intersection point; and Signed and Sealed this
Seventeenth Day of February, 2015

Michelle K. Lee
*Deputy Director of the United States Patent and Trademark Office* the strength reinforcement intersection points are arranged on an entire surface of a radial cross section of the honeycomb structure which is perpendicular to an axial direction of the honeycomb structure.

2. The honeycomb structure according to claim 1, wherein the strength reinforcement intersection points are alternately arranged in one of three directions in which the partition walls are arranged on the entire of the radial cross section of the honeycomb structure.

3. The honeycomb structure according to claim 1, wherein the strength reinforcement intersection points are arranged on the entire surface of a radial cross section in order to divide the entire of the radial cross section of the honeycomb structure into a plurality of areas.

4. The honeycomb structure according to claim 3, wherein the strength reinforcement intersection points are arranged in a hexagonal lattice pattern on the entire of the radial cross section of the honeycomb structure.

5. The honeycomb structure according to claim 4, wherein a gap between facing sides in a hexagonal shape obtained by connecting the strength reinforcement intersection points in the hexagonal lattice pattern is within a range of 20 to 50 mm.

6. The honeycomb structure according to claim 4, wherein a thickness of each of the strength reinforcement sides as the strength reinforcement partition walls has a thickness which is within a range of 1.1 to 1.6 times of a thickness of each of the basic partition walls.

7. The honeycomb structure according to claim 1, wherein the surfaces of the partition walls and the strength reinforcement partition walls support catalyst which is capable of purifying exhaust gas.

8. The honeycomb structure according to claim 2, wherein the strength reinforcement intersection points are arranged on the entire surface of a radial cross section in order to divide the entire of the radial cross section of the honeycomb structure into a plurality of areas.

9. The honeycomb structure according to claim 8, wherein the strength reinforcement intersection points are arranged in a hexagonal lattice pattern on the entire of the radial cross section of the honeycomb structure.

10. The honeycomb structure according to claim 9, wherein a gap between facing sides in a hexagonal shape obtained by connecting the strength reinforcement intersection points in the hexagonal lattice pattern is within a range of 20 to 50 mm.

11. The honeycomb structure according to claim 10, wherein a thickness of each of the strength reinforcement sides as the strength reinforcement partition walls has a thickness which is within a range of 1.1 to 1.6 times of a thickness of each of the basic partition walls.

12. The honeycomb structure according to claim 2, wherein the surfaces of the partition walls and the strength reinforcement partition walls support catalyst which is capable of purifying exhaust gas.

13. The honeycomb structure according to claim 3, wherein the surfaces of the partition walls and the strength reinforcement partition walls support catalyst which is capable of purifying exhaust gas.

14. The honeycomb structure according to claim 4, wherein the surfaces of the partition walls and the strength reinforcement partition walls support catalyst which is capable of purifying exhaust gas.

15. The honeycomb structure according to claim 5, wherein the surfaces of the partition walls and the strength reinforcement partition walls support catalyst which is capable of purifying exhaust gas.

16. The honeycomb structure according to claim 6, wherein the surfaces of the partition walls and the strength reinforcement partition walls support catalyst which is capable of purifying exhaust gas.